United States Patent
Burke et al.

(10) Patent No.: US 10,026,419 B2
(45) Date of Patent: Jul. 17, 2018

(54) MULTISENSORY SPEECH DETECTION

(71) Applicant: Google LLC, Mountain View, CA (US)

(72) Inventors: Dave Burke, London (GB); Michael J. LeBeau, New York, NY (US); Konrad Gianno, Forch (CH); Trausti T. Kristjansson, Mountain View, CA (US); John Nicholas Jitkoff, Palo Alto, CA (US); Andrew W. Senior, New York, NY (US)

(73) Assignee: Google LLC, Mountain View, CA (US)

( * ) Notice: Subject to any disclaimer, the term of this patent is extended or adjusted under 35 U.S.C. 154(b) by 514 days.

(21) Appl. No.: 14/645,802

(22) Filed: Mar. 12, 2015

(65) Prior Publication Data
US 2015/0287423 A1 Oct. 8, 2015

Related U.S. Application Data

(63) Continuation of application No. 12/615,583, filed on Nov. 10, 2009, now Pat. No. 9,009,053.
(Continued)

(51) Int. Cl.
*G10L 25/78* (2013.01)
*G10L 15/10* (2006.01)
(Continued)

(52) U.S. Cl.
CPC ........... *G10L 25/78* (2013.01); *G06F 3/0346* (2013.01); *G06F 3/167* (2013.01); *G10L 15/10* (2013.01);
(Continued)

(58) Field of Classification Search
CPC ......... G10L 25/78; G10L 15/10; G10L 17/00; G06F 3/0346; G06F 3/167; H04W 4/026
See application file for complete search history.

(56) References Cited

U.S. PATENT DOCUMENTS

| | | | |
|---|---|---|---|
| 5,657,422 A | 8/1997 | Janiszewski et al. |
| 5,867,386 A | 2/1999 | Hoffberg et al. |

(Continued)

FOREIGN PATENT DOCUMENTS

| | | |
|---|---|---|
| EP | 1 063 837 | 12/2000 |
| EP | 1 662 481 | 5/2006 |

(Continued)

OTHER PUBLICATIONS

'Android' [online]. "Android Open Source Project," 2010, [retrieved on Feb. 9, 2012]. Retrieved from the Internet: URL: < http://source.android.com>. 2 pages.
(Continued)

*Primary Examiner* — Gregory J Toatley
*Assistant Examiner* — Terence Stifter, Jr.
(74) *Attorney, Agent, or Firm* — Honigman Miller Schwartz and Cohn LLP

(57) ABSTRACT

A computer-implemented method of multisensory speech detection is disclosed. The method comprises determining an orientation of a mobile device and determining an operating mode of the mobile device based on the orientation of the mobile device. The method further includes identifying speech detection parameters that specify when speech detection begins or ends based on the determined operating mode and detecting speech from a user of the mobile device based on the speech detection parameters.

20 Claims, 19 Drawing Sheets

Related U.S. Application Data

(60) Provisional application No. 61/113,061, filed on Nov. 10, 2008.

(51) Int. Cl.
  *G06F 3/16* (2006.01)
  *G10L 17/00* (2013.01)
  *H04W 4/02* (2018.01)
  *H04R 1/08* (2006.01)
  *H04M 1/725* (2006.01)
  *G06F 3/0346* (2013.01)

(52) U.S. Cl.
  CPC ......... *G10L 17/00* (2013.01); *H04M 1/72569* (2013.01); *H04R 1/08* (2013.01); *H04W 4/026* (2013.01); *H04M 2250/12* (2013.01); *H04M 2250/74* (2013.01)

(56) References Cited

U.S. PATENT DOCUMENTS

| | | |
|---|---|---|
| 5,875,108 A | 2/1999 | Hoffberg et al. |
| 6,006,175 A | 12/1999 | Holzrichter |
| 6,453,281 B1 | 9/2002 | Walters et al. |
| 6,563,911 B2 | 5/2003 | Mahoney |
| 6,615,170 B1 | 9/2003 | Liu et al. |
| 6,640,145 B2 | 10/2003 | Hoffberg et al. |
| 6,678,629 B2 | 1/2004 | Tsuji |
| 6,721,706 B1 | 4/2004 | Strubbe et al. |
| 6,754,373 B1 | 6/2004 | De Cuetos et al. |
| 6,813,491 B1 | 11/2004 | McKinney |
| 7,321,774 B1 | 1/2008 | Lau et al. |
| 7,496,693 B2 | 2/2009 | Cook et al. |
| 7,653,508 B1 | 1/2010 | Kahn et al. |
| 7,783,729 B1 | 8/2010 | Macaluso |
| 7,881,902 B1 | 2/2011 | Kahn et al. |
| 8,112,281 B2 | 2/2012 | Yeung et al. |
| 8,195,319 B2 | 6/2012 | Kristjansson et al. |
| 8,228,292 B1 | 7/2012 | Ruiz et al. |
| 8,326,636 B2 | 12/2012 | White |
| 8,428,759 B2 | 4/2013 | Kristjansson et al. |
| 8,504,185 B2 | 8/2013 | Kristjansson et al. |
| 8,648,799 B1 | 2/2014 | Lloyd |
| 8,862,474 B2 | 10/2014 | Burke |
| 8,922,485 B1 | 12/2014 | Lloyd |
| 9,009,053 B2 | 4/2015 | Burke |
| 9,570,094 B2 | 2/2017 | Burke |
| 2002/0077826 A1 | 6/2002 | Hinde et al. |
| 2002/0167488 A1 | 11/2002 | Hinckley et al. |
| 2003/0025603 A1 | 2/2003 | Smith |
| 2003/0103091 A1 | 6/2003 | Wong et al. |
| 2003/0122921 A1 | 7/2003 | Taib et al. |
| 2003/0171926 A1 | 9/2003 | Suresh et al. |
| 2003/0182113 A1 | 9/2003 | Xuang |
| 2003/0191609 A1 | 10/2003 | Bernardi et al. |
| 2004/0131259 A1 | 7/2004 | Nefian |
| 2004/0243257 A1 | 12/2004 | Theimer |
| 2004/0260547 A1 | 12/2004 | Cohen et al. |
| 2005/0033571 A1 | 2/2005 | Huang et al. |
| 2005/0135583 A1 | 6/2005 | Kardos |
| 2006/0010400 A1 | 1/2006 | Dehlin et al. |
| 2006/0015337 A1 | 1/2006 | Kurzweil et al. |
| 2006/0017692 A1 | 1/2006 | Wehrenberg et al. |
| 2006/0025206 A1 | 2/2006 | Walker et al. |
| 2006/0052109 A1 | 3/2006 | Ashman, Jr. et al. |
| 2006/0079291 A1 | 4/2006 | Granovetter et al. |
| 2006/0173678 A1 | 8/2006 | Gilbert et al. |
| 2006/0293793 A1 | 12/2006 | Tamura |
| 2007/0061335 A1 | 3/2007 | Ramer et al. |
| 2007/0083470 A1 | 4/2007 | Bonner et al. |
| 2007/0150286 A1 | 6/2007 | Millet et al. |
| 2007/0157978 A1 | 7/2007 | Jonte et al. |
| 2007/0298751 A1 | 12/2007 | Wulff et al. |
| 2008/0154870 A1 | 6/2008 | Evermann et al. |
| 2008/0192005 A1 | 8/2008 | Elgoyhen et al. |
| 2008/0274696 A1 | 11/2008 | Bakshi et al. |
| 2009/0016501 A1* | 1/2009 | May ...................... H04M 1/654 |
| | | 379/93.09 |
| 2009/0132197 A1 | 5/2009 | Rubin et al. |
| 2009/0150156 A1 | 6/2009 | Kennewick et al. |
| 2009/0164219 A1 | 6/2009 | Yeung et al. |
| 2009/0182560 A1* | 7/2009 | White ...................... G10L 15/22 |
| | | 704/235 |
| 2009/0184849 A1 | 7/2009 | Nasiri et al. |
| 2009/0262074 A1 | 10/2009 | Nasiri et al. |
| 2009/0281809 A1 | 11/2009 | Reuss |
| 2009/0303184 A1 | 12/2009 | Tao et al. |
| 2009/0306980 A1 | 12/2009 | Shin |
| 2010/0020951 A1 | 1/2010 | Basart et al. |
| 2010/0031143 A1 | 2/2010 | Rao et al. |
| 2010/0056055 A1 | 3/2010 | Ketari |
| 2010/0069123 A1 | 3/2010 | Araradian et al. |
| 2010/0090712 A1 | 4/2010 | Vandermeijden |
| 2010/0105364 A1 | 4/2010 | Yang |
| 2010/0121636 A1 | 5/2010 | Burke et al. |
| 2010/0174421 A1 | 7/2010 | Tsai et al. |
| 2010/0223582 A1 | 9/2010 | Dods |
| 2011/0093821 A1 | 4/2011 | Wigdor et al. |
| 2011/0106534 A1 | 5/2011 | LeBeau et al. |
| 2011/0115823 A1 | 5/2011 | Huebner |
| 2011/0199292 A1 | 8/2011 | Kilbride |
| 2011/0216153 A1 | 9/2011 | Tasker |
| 2011/0238191 A1 | 9/2011 | Kristjansson et al. |
| 2012/0022675 A1 | 1/2012 | Kristjansson et al. |
| 2012/0035924 A1 | 2/2012 | Jitkoff et al. |
| 2012/0226472 A1 | 9/2012 | Yuen et al. |
| 2012/0278074 A1 | 11/2012 | Burke et al. |
| 2012/0296655 A1 | 11/2012 | Kristjansson et al. |
| 2013/0013315 A1 | 1/2013 | Burke et al. |
| 2013/0013316 A1 | 1/2013 | Burke et al. |

FOREIGN PATENT DOCUMENTS

| | | |
|---|---|---|
| EP | 1 741 197 | 1/2007 |
| JP | 2000/201205 | 7/2000 |
| JP | 2000/322098 | 11/2000 |
| JP | 2005-031632 | 2/2005 |
| JP | 2007/094104 | 4/2007 |
| JP | 2007280219 | 10/2007 |
| KR | 10-2008-0061549 | 7/2008 |
| WO | 2007/149731 | 12/2007 |
| WO | 2011/119431 | 9/2011 |

OTHER PUBLICATIONS

Bartlett, "Rock 'n' Scroll is Here to Stay," *IEEE Comput. Graph. Appl.*, 20(3):2000.

Buxton. "Lexical and pragmatic considerations of input structures." *SIGGRAPH Comput. Graph*, 1983, 17(1): 31-37.

Dupont et al., "Assessing Local Noise Level Estimation Methods," *Workshop on Robust Methods For Speech Recognition in Adverse Conditions* (Nokia, COST249, IEEE), 1999, pp. 115-118, Tampere, Finland.

Gonsalves. 'Information Week' [online]. "Apple iPhone Market Share Slips in 4Q," 2010, [retrieved on Feb. 9, 2012]. Retrieved from the Internet: URL: <http://www.informationweek.com/news/telecom/business/showArticle.jhtml?articleID=222600940>. 2 pages.

'Google' [online]. "Google Maps with Street View," 2011, [retrieved on Feb. 9, 2012]. Retrieved from the Internet: URL: < http://maps.google.com/help/maps/streetview/>. 1 page.

'Google' [online]. "Nexus One," 2012, [retrieved on Feb. 10, 2012]. Retrieved from the Internet: URL: < http://www.google.com/phone/detail/nexus-one>. 2 pages.

Harrison et al. "Squeeze me, hold me, tilt me! An exploration of manipulative user interfaces." Conference paper in *CHI '98: Proceedings of the SIGCHI conference on Human factors in computing.* New York, ACM/Addison-Wesley, 1998, pp. 17-24. Abstract Only, [retrieved on Feb. 10, 2012]. Retrieved from the Internet: URL: < http://www.mendeley.com/research/squeeze-me-hold-me-tilt-me-an-exploration-of-manipulative-user-interfaces/#page-1>. 1 page.

(56) References Cited

OTHER PUBLICATIONS

Hinckley et al. "Design and analysis of delimiters for selection-action pen gesture phrases in scriboli." Conference paper in *CHI '05: Proceedings of the SIGCHI conference on human factors in computing systems*. New York, ACM, 2005, pp. 451-460.
Hinckley et al. "Sensing techniques for mobile interaction." Conference paper in *UIST '00: Proceedings of the 13th annual ACM symposium on User interface software and technology*. New York, ACM, 2000, pp. 91-100.
Hirsh et al., "Noise estimation techniques for robust speech recognition," *Proc. IEEE Internat. Conf. Audio*, 1995, 12 (1):153-156.
Jones et al. "GesText: Accelerometer-based Gestural Text-Entry Systems." Conference paper in *CHI '10: Proceedings of the SIGCHI conference on Human factors in computing systems*. 2010, 10 pages.
Li et al. "Experimental analysis of mode switching techniques in pen-based user interfaces." Conference paper in CHI '05: Proceedings of the SIGCHI conference on Human factors in computing systems. New York, ACM, 2005, pp. 461-470.
Liu et al. "User evaluation of lightweight user authentication with a single tri-axis accelerometer." Conference paper in *MobileHCI '09: Proceedings of the 11th International Conference on Human-Computer Interaction with Mobile Devices and Services*. New York, ACM, 2009, pp. 1-10.
Myers and Rabiner. "A Comparative Study of Several Dynamic Time-warping Algorithms for Connected Word Recognition." *The Bell System Technical Journal*, 1981, 60(7):1389-1409.
'Nintendo' [online]. "Wii at Nintendo," 2012, [retrieved on Feb. 9, 2012]. Retrieved from the Internet: URL: < http://www.nintendo.com/wii>. 3 pages.
Partridge et al. "TiltType: accelerometer-supported text entry for very small devices." Conference paper in *UIST '02: Proceedings of the 15th annual ACM symposium on User interface software and technology*. New York, ACM, 2002, pp. 201-204.
Rekimoto. "Tilting operations for small screen interfaces." Conference paper in *UIST '96: Proceedings of the 9th annual ACM symposium on User interface software and technology*. New York, ACM, 1996, pp. 167-168.
Ruiz et al. "A model of non-preferred hand mode switching." Conference paper in GI '08: *Proceedings of graphics interface 2008*. Toronto, Canadian Information Processing Society, 2008, pp. 49-56.
Ruiz and Lank. "A study on the scalability of non-preferred hand mode manipulation." Conference paper in ICMI '07: *Proceedings of the 9th international conference on multimodal interfaces*. New York, ACM, 2007, pp. 170-177.
Small and Ishii. "Design of spatially aware graspable displays." Conference paper in *Chi '97: Chi '97 extended abstracts on human factors in computing systems*. New York, ACM, 1997, pp. 367-368.
Weberg et al. "A piece of butter on the PDA display." Conference Paper in *CHI '01: CHI '01 extended abstracts on human factors in computing systems*. New York, ACM, 2001, pp. 435-436.
Wigdor and Balakrishnan. "TiltText: using tilt for text input to mobile phones." Conference paper in *UIST '03: Proceedings of the 16th annual ACM symposium on User interface software and technology*. New York, ACM, 2003, pp. 81-90.
'Wikipedia' [online]. "Dynamic time warping—Wikipedia, the free encyclopedia," 2011, [retrieved on Feb. 9, 2012]. Retrieved from the Internet: URL: <http://en.wikipedia.org/wiki/Dynamic_time_warping>. 3 pages.
'Wikipedia' [online]. "iPhone—Wikipedia, the free encyclopedia," 2012, [retrieved on Feb. 9, 2012]. Retrieved from the Internet: < http://en.wikipedia.org/wiki/IPhone>. 16 pages.
Wobbrock et al. "Gestures without libraries, toolkits or training: a $1 recognizer for user interface prototypes." Conference paper in *UIST '07: Proceedings of the 20th annual ACM symposium on User interface software and technology*. New York, ACM, 2007, pp. 159-168.
Ris et al., "Assessing Local Noise Level Estimation Methods: Application to Noise Robust ASR," *Speech Communication*, 2001, 34:141-158.
Weiss et al., "DySANA: Dynamic Speech and Noise Adaptation for Voice Activity Detection," *ICASSP*, 2008, 1-4.
Invitation to Pay Additional Fees and, Where Applicable, Protest Fee, PCT/US2009/063874, dated Feb. 24, 2010, 26 pages.
Authorized Officer Simin Baharlou, International Preliminary Report on Patentability for Application No. PCT/US2009/063874, dated May 19, 2011 2 pages.
Authorized Officer Brigitte Chiarizia, International Search Report and Written Opinion for Application No. PCT/US2009/063874, dated Jul. 12, 2010, 17 pages.
European Office Action in European Application No. 09 793365.9-1224, dated Feb. 22, 2012, 5 pages.
Authorized Officer A. Urlichs. International Search Report in PCT Application No. PCT/US2011/029009, dated Jul. 11, 2011, 11 pages.
Specification of U.S. Appl. No. 60/021,335.
Japanese Office Action issued in JP Application Serial No. 2011-535763, dated Jun. 11, 2013, 9 pages (with English translation).
Decision of Rejection in Korean Application No. 10-2011-7013049 dated Dec. 13, 2016, 6 pages (with English translation).
Korean Office Action issued in Korean Application No. 10-2017-7011837, dated Jul. 25, 2017, 6 pages (with English Translation).
Office Action issued in Korean Application No. 10-2011-7013049 dated May 26, 2016, 10 pages (with English translation).
Extended European Search Report issued in European Application No. 17183224.9, dated Nov. 7, 2017, 8 pages.

* cited by examiner

MULTISENSORY SPEECH DETECTION

CROSS-REFERENCE TO RELATED APPLICATION

This Application is a continuation of U.S. Pat. No. 9,009,053 (application Ser. No. 12/615,583), titled "Multisensory Speech Detection" filed Nov. 10, 2009, which claims priority under 35 U.S.C. § 119(e) to U.S. Provisional Application Ser. No. 61/113,061 titled "Multisensory Speech Detection" filed on Nov. 10, 2008, the disclosure of which is incorporated herein by reference.

TECHNICAL FIELD

This instant specification relates to speech detection.

BACKGROUND

As computer processors have decreased in size and expense, mobile computing devices have become increasingly widespread. Designed to be portable, many mobile computing devices are lightweight and small enough to be worn or carried in a pocket or handbag. However, the portability of modern mobile computing devices comes at a price: today's mobile computing devices often incorporate small input devices to reduce the size and weight of the device. For example, many current mobile devices include small keyboards that many people (especially those with poor dexterity) find difficult to use.

Some mobile computing devices address this problem by allowing a user to interact with the device using speech. For example, a user can place a call to someone in his contact list by simply speaking a voice command (e.g., "call") and the name of the person into the phone. However, speech can be difficult to distinguish from background noise in some environments, and it can hard to capture user speech in a manner that is natural to the user. In addition, it can be challenging to begin recording speech at the right time. For example, if recording begins after the user has started speaking the resulting recording may not include all of the user's voice command. Furthermore, a user may be notified that a spoken command was not recognized by the device after the user has spoken, which can be frustrating for users.

SUMMARY

In general, this document describes systems and techniques for detecting speech. In some implementations, a mobile computing device can determine whether a user is speaking (or is about to speak) to the device based on the changing orientation (i.e., distance from or proximity to a user and/or angle) of the device. For example, the device may use one or more sensors to determine if the user has made a particular gesture with the device such as bringing it from in front of the user's face to a normal talk position with the device at the user's ear. If the gesture is detected, the device may emit a sound to indicate that the user may start speaking and audio recording may commence. A second gesture of moving the device away from the user's ear can be used as a trigger to cease recording.

In addition, the device may determine whether it is in a specified "pose" that corresponds to a mode of interacting with the device. When the device is placed into a predefined pose, the device may begin sound recording. Once the device has been removed from the pose, sound recording may cease. In some cases, auditory, tactile, or visual feedback (or a combination of the three) may be given to indicate that the device has either started or stopped recording.

In one implementation, a computer-implemented method of multisensory speech detection is disclosed. The method comprises determining an orientation of a mobile device and determining an operating mode of the mobile device based on the orientation of the mobile device. The method further includes identifying speech detection parameters that specify when speech detection begins or ends based on the detected operating mode and detecting speech from the user of the mobile device based on the speech detection parameters.

In some aspects, detecting an orientation of a mobile device further comprises detecting an angle of the mobile device. In yet further aspects, detecting an orientation of a mobile device further comprises detecting a proximity of the mobile device to the user of the mobile device. Also, determining an operating mode of a mobile device comprises using a Bayesian network to identify a movement of the mobile device.

In another implementation, a system for multisensory speech detection is disclosed. The system can include one or more computers having at least one sensor that detects an orientation of a mobile device relative to a user of the mobile device. The system can further include a pose identifier that identifies a pose of the mobile device based on the detected orientation of the mobile device. In addition, the system may include a speech endpointer that identifies selected speech detection parameters that specify when speech detection begins or ends.

In certain aspects, the system can include an accelerometer. The system can also include a proximity sensor. In addition, the system may also include a gesture classifier that classifies movements of the mobile device.

The systems and techniques described here may provide one or more of the following advantages. First, a system can allow a user to interact with a mobile device in a natural manner. Second, recorded audio may have a higher signal-to-noise ratio. Third, a system can record speech without clipping the speech. Fourth, a system may provide feedback regarding audio signal quality before a user begins speaking. The details of one or more embodiments of the multisensory speech detection feature are set forth in the accompanying drawings and the description below. Other features and advantages of the multisensory speech detection feature will be apparent from the description and drawings, and from the claims.

DESCRIPTION OF DRAWINGS

Like reference symbols in the various drawings indicate like elements.

DETAILED DESCRIPTION

This document describes systems and techniques for detecting speech. In some implementations, a mobile device can determine its distance from a user, as well as its angle relative to the user. Based on this information, the device can initiate or stop voice recording. In an illustrative example, the user may place the device in a predetermined position, e.g., next to his ear. The device may detect that it has entered this position and begin voice recording. Once the user moves the device out of this position, the device may stop recording user input. The recorded speech may be used as input to an application running on the device or running on an external device.

Figure 1:
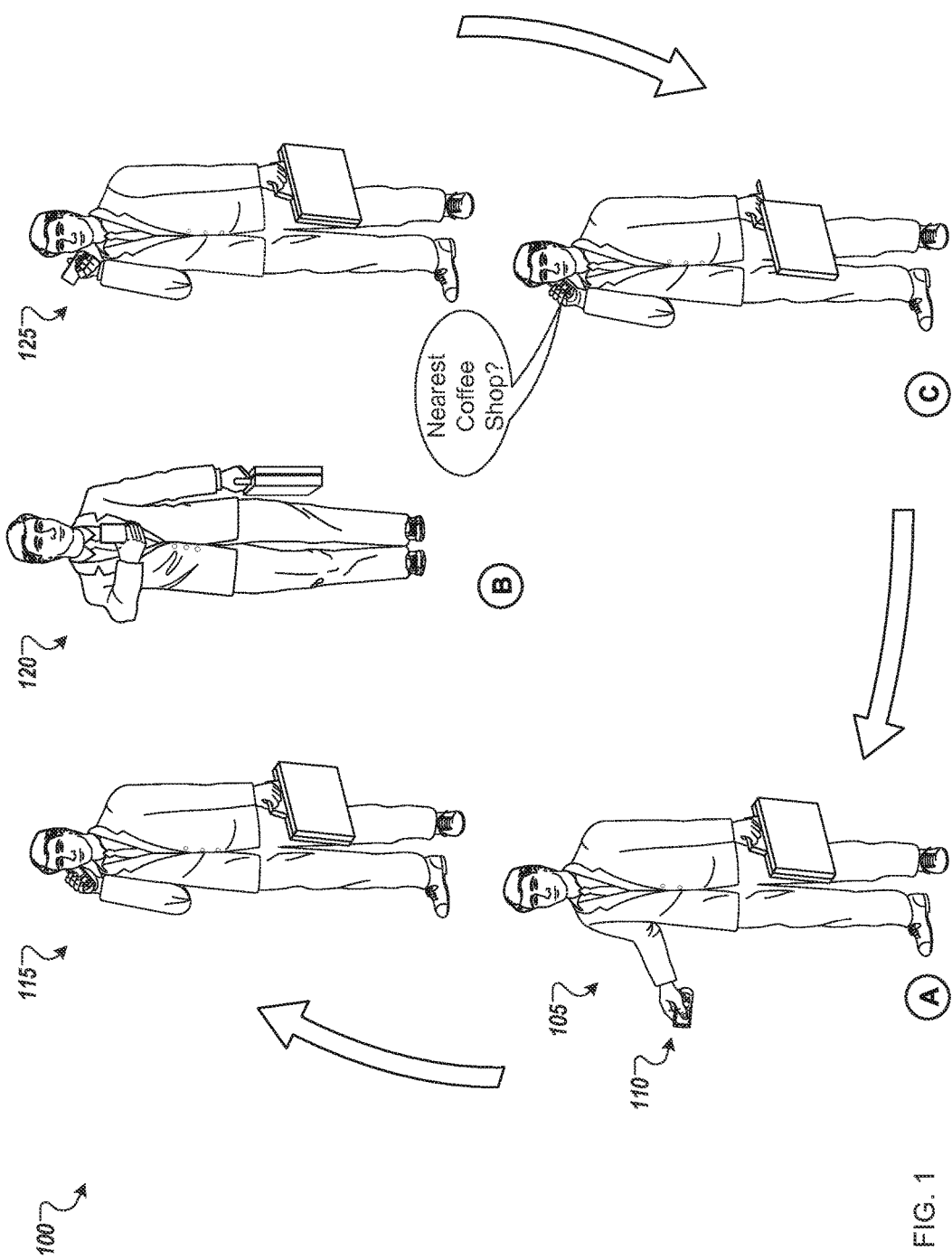
FIG. 1 is a conceptual diagram of an example of multisensory speech detection.

FIG. 1 is a conceptual diagram 100 of multisensory speech detection. The diagram 100 depicts a user 105 holding a mobile device 110. The mobile device 110 may be a cellular telephone, PDA, laptop, or other appropriate portable computing device. In the illustrative example shown in FIG. 1, the user 105 may want to interact with an application running on the mobile device 110. For instance, the user may want to search for the address of a business using a Web-based application such as GOOGLE MAPS. Typically, the user 105 would use the mobile device 110 to type the name of the business into a search box on an appropriate website to conduct the search. However, the user 105 may be unwilling or unable to use the device 110 to type the necessary information into the website's search box.

In the illustrative example of multisensory speech detection shown in FIG. 1, the user 105 may conduct the search by simply placing the mobile device 110 in a natural operating position and saying the search terms. For example, in some implementations, the device 110 may begin or end recording speech by identifying the orientation of the device 110. The recorded speech (or text corresponding to the recorded speech) may be provided as input to a selected search application.

The letters "A," "B," and "C" in FIG. 1 represent different states in the illustrative example of multisensory speech detection. In State A, the user 105 is holding the device 110 in a non-operating position; that is, a position outside a predetermined set of angles or too far from the user 105 or, in some cases, both. For example, between uses, the user 105 may hold the device 110 at his side as shown in FIG. 1 or place the device in a pocket or bag. If the device 110 has such an orientation, the device 110 is probably not in use, and it is unlikely that the user 105 is speaking into the mobile device 110. As such, the device 110 may be placed in a non-recording mode.

When the user 105 wants to use the device 110, the user 105 may place the device 110 in an operating mode/position. In the illustrative example shown in the diagram 100, the device 110 may determine when it is placed in selected operating positions, referred to as poses. State B shows the mobile device 110 in several example poses. For example, the left-most figure in State B illustrates a "telephone pose" 115. A telephone pose can, in some implementations, correspond to the user 105 holding the mobile device 110 in a position commonly used to speak into a telephone. For example, as shown in FIG. 1, the device 110 may be held to a side of the user's 105 head with the speaker of the device 110 held near the user's 105 ear. Holding the device 110 in this way can make it easier for the user 105 to hear audio emitted by the device 110 and speak into a microphone connected to the device 110.

The middle figure shown in State B depicts the user 105 holding the device 110 in a "PDA pose" 120. For example, as shown in FIG. 1, PDA pose 120 may correspond to the user 105 holding the mobile device 110 at nearly arm's length and positioned so that the user 105 can see and interact with the mobile device 110. For instance, in this position, the user 105 can press buttons on the keypad of the device 110 or a virtual keyboard displayed on the device's 110 screen. In some cases, the user 105 may also enter voice commands into the device 110 in this position.

Finally, the right-most figure shown in State B illustrates a "walkie-talkie pose" 125. In some cases, a walkie-talkie pose 125 may comprise the user 105 holding the mobile device 110 to his face such that the device's 110 microphone is close the user's 105 mouth. This position may allow the user 105 to speak directly into the microphone of the device 110, while also being able to hear sounds emitted by a speakerphone linked to the device 110.

Although FIG. 1 shows three poses, others may be used. For instance, in an alternative implementation, a pose may take into account whether a mobile device is open or closed. For example, the mobile device 110 shown in FIG. 1 may be a "flip phone"; that is, a phone having a form factor that includes two or more sections (typically a lid and a base) that can fold together or apart using a hinge. For some of these devices, a pose may include whether the phone is open or closed, in addition to (or in lieu of) the orientation of the phone. For instance, if the mobile device 110 is a flip phone, the telephone pose 115 shown in FIG. 1 may include the device being open. Even though the current example describes a flip phone, other types or form factors (e.g., a phone that swivels or slides open) may be used.

When the device 110 is identified as being in a predetermined pose, the device 110 may begin recording auditory information such as speech from the user 115. For example, State C depicts a user speaking into the device 110 while the device 110 is in the telephone pose. Because, in some implementations, the device 110 may begin recording auditory information when the device 110 is detected in the telephone pose 115, the device 110 may begin recording just before (or as) the user 105 starts speaking. As such, the device 110 may capture the beginning of the user's speech.

When the device 110 leaves a pose, the device 110 may stop recording. For instance, in the example shown in FIG. 1, after the user 105 finishes speaking into the device 110, he may return the device 110 to a non-operating position by, for example, placing the device 110 by his side as shown at State A. When the device 110 leaves a pose (telephone pose 115 in the current example), the device 110 may stop recording. For example, if the device 110 is outside a selected set of angles and/or too far from the user 105, the device 110 can cease its recording operations. In some cases, the information recorded by the device 110 up to this point can be provided to an application running on the device or on a remote device. For example, as noted above, the auditory information can be converted to text and supplied to a search application being executed by the device 110.

Figure 2:
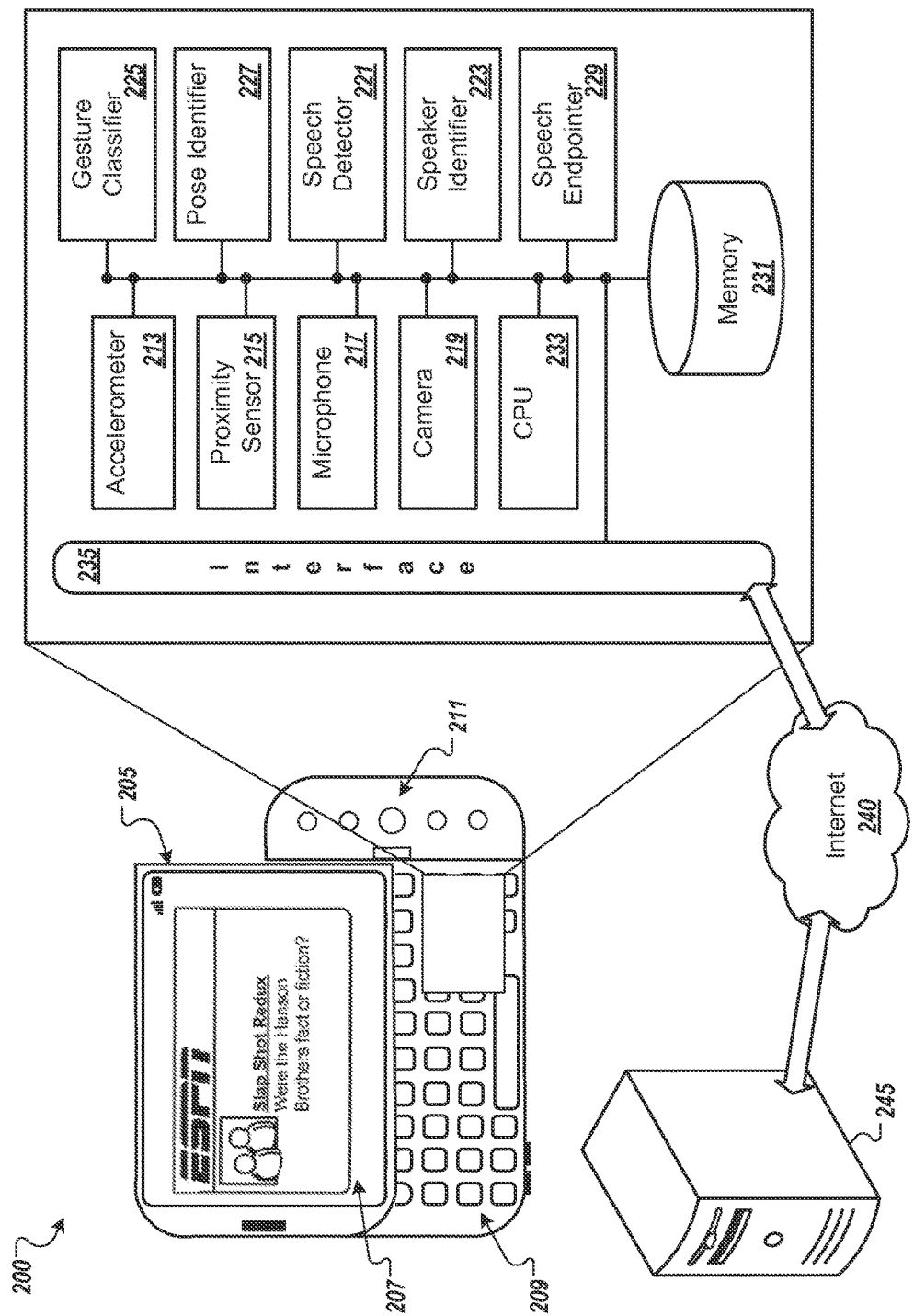
FIG. 2 is a block diagram of an example multisensory speech detection system.

FIG. 2 is a block diagram 200 of an example multisensory speech detection system. The block diagram 200 shows an illustrative mobile device 205. The device 205 includes a screen 207 that, in some cases, can be used to both display output to a user and accept user input. For example, the screen 207 may be a touch screen that can display a keypad that can be used to enter alphanumeric characters. The device 205 may also include a physical keypad 209 that may also be used to input information into the device. In some cases the device 205 may include a button (not shown) on the keypad 209 or another part of the phone (e.g., on a side of the phone) that starts and stops a speech application running on the device 205. Finally, the device 205 can incorporate a trackball 211 that, in some cases, may be used to, among other things, manipulate a pointing element displayed on a graphical user interface on the device 205.

The device 205 may include one or more sensors that can be used to detect speech readiness, among other things. For example, the device 205 can include an accelerometer 213. The accelerometer 213 may be used to determine an angle of the device. For example, the accelerometer 213 can determine an angle of the device 205 and supply this information to other device 205 components.

In addition to the accelerometer 213, the device 205 may also include a proximity sensor 215. In some cases, the proximity sensor 215 can be used to determine how far the device 205 is from a user. For example, the proximity sensor 215 may include an infrared sensor that emits a beam of infrared light and uses the reflected signal to compute the distance to an object. In alternative implementations, other types of sensors may be used. For example, the sensor may be capacitive, photoelectric, or inductive, among other kinds of sensors.

The device can also include a camera 219. Signals from the camera 219 can be processed to derive additional information about the pose of the device 205. For example, if the camera 219 points toward the user, the camera 219 can determine the proximity of the user. In some cases, the camera 219 can determine the angle of the user using features having a known angle such as the horizon, vehicles, pedestrians, etc. For example, if the camera 219 is pointing at a general scene that does not include a user, the camera 219 can determine its orientation in the scene in an absolute coordinate system. However, if the camera 219 can see the user, the camera 219 can determine its orientation with respect to the user. If the camera 219 can see both the general scene and the user, the camera 219 can determine both its orientation with respect to the user and the scene and, in addition, can determine where the user is in the scene.

The device may also include a central processing unit 233 that executes instructions stored in memory 231. The processor 233 may comprise multiple processors responsible for coordinating interactions among other device components and communications over an I/O interface 235. The device 205 may communicate with a remote computing device 245 through the Internet 240. Some or all of the processing performed by the gesture classifier 225, pose identifier 227, speech detector 221, speaker identifier 223 and speech endpointer 229 can be performed by the remote computing device 245.

A microphone 217 may capture auditory input and provide the input to both a speech detector 221 and a speaker identifier 223. In some implementations, the speech detector 221 may determine if a user is speaking into the device 205. For example, the speech detector 221 can determine whether the auditory input captured by the microphone 217 is above a threshold value. If the input is above the threshold value, the speech detector 221 may pass a value to another device 205 component indicating that the speech has been detected. In some cases, the device 205 may store this value in memory 231 (e.g, RAM or a hard drive) for future use.

In some cases, a speech detector 221 can determine when a user is speaking. For example, the speech detector 221 can determine whether captured audio signals include speech or consist entirely of background noise. In some cases, the speech detector 221 may assume that the initially detected audio is noise. Audio signals at a specified magnitude (e.g., 6 dB) above the initially detected audio signal may be considered speech.

If the device includes a camera 219 the camera 219 may also provide visual signals to the speech detector 221 that can be used to determine if the user is speaking. For example, if the user's lips are visible to the camera, the motion of the lips may be an indication of speech activity, as may be correlation of that motion with the acoustic signal. A lack of motion in the user's lips can, in some cases, be evidence that the detected acoustic energy came from another speaker or sound source.

The speaker identifier 223, in some cases, may be able to determine the identity of the person speaking into the device 205. For example, the device 205 may store auditory profiles (e.g., speech signals) of one or more users. The auditory information supplied by the microphone 217 may be compared to the profiles; a match may indicate that an associated user is speaking into the device 205. Data indicative of the match may be provided to other device 205 components, stored in memory, or both. In some implementations, identification of a speaker can be used to confirm that the speech is not background noise, but is intended to be recorded.

The speaker identifier 223 can also use biometric information obtained by the camera 219 to identify the speaker. For example, biometric information captured by the camera can include (but is not limited to) face appearance, lip motion, ear shape, or hand print. The camera may supply this information to the speaker identifier 223. The speaker identifier 223 can use any or all of the information provided by the camera 219 in combination with (or without) acoustic information to deduce the speaker's identity.

The device 205 may also include a gesture classifier 225. The gesture classifier 225 may be used to classify movement of the device 205. In some cases, the accelerometer 213 can supply movement information to the gesture classifier 225 that the gesture classifier 225 may separate into different classifications. For example, the gesture classifier 225 can classify movement of the phone into groups such as "shake" and "flip." In addition, the gesture classifier 225 may also classify motion related to gestures such as "to mouth," "from mouth," "facing user," "to ear," and "from ear."

A pose identifier 227 included in the device 205 may infer/detect different poses of the device 205. The pose identifier 227 may use data provided by the proximity sensor 215 and the gesture classifier 225 to identify poses. For example, the pose identifier 227 may determine how far the device 205 is from an object (e.g., a person) using information provided by the proximity sensor 215. This information, combined with a gesture classification provided by the gesture classifier 225 can be used by the posture identifier 227 to determine which pose (if any) the device 205 has been placed in. In one example, if the gesture classifier 225 transmits a "to ear" classification to the pose identifier 227 and the proximity sensor 215 indicates that the device is being held close to the user, the pose identifier 227 may determine that the device 205 is in telephone pose. A camera 219 can also be used to provide evidence about movement. For example, the optical flow detected by the camera 219 may provide evidence of movement.

The device may also include a speech endpointer 229. The speech endpointer 229, in some implementations, can combine outputs from the pose identifier 227, speaker identifier 223, and speech detector 221, to determine, inter alia, whether a user is speaking into the device, beginning to speak into the device, or has stopped speaking into the device. For example, the pose identifier 227 may transmit information to the endpointer 229 indicating that the device is not in an operating position. Inputs from the speech detector 221 and speaker identifier 223 may indicate that the user is not currently speaking. The combination of these inputs may indicate to the endpointer 229 that the user has stopped speaking.

Figure 3:
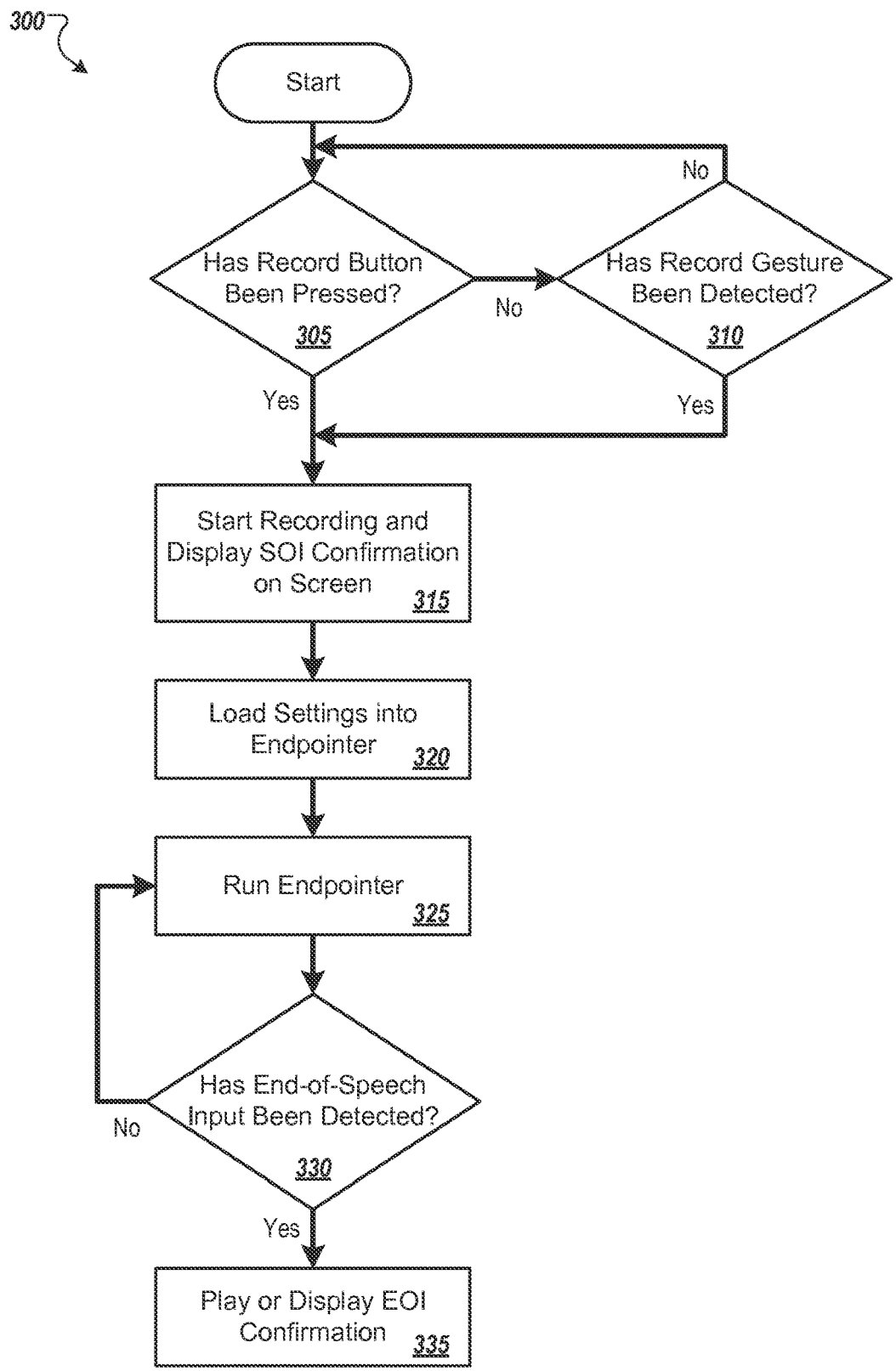
FIG. 3 illustrates an example process of multisensory speech detection.
Figure 4:
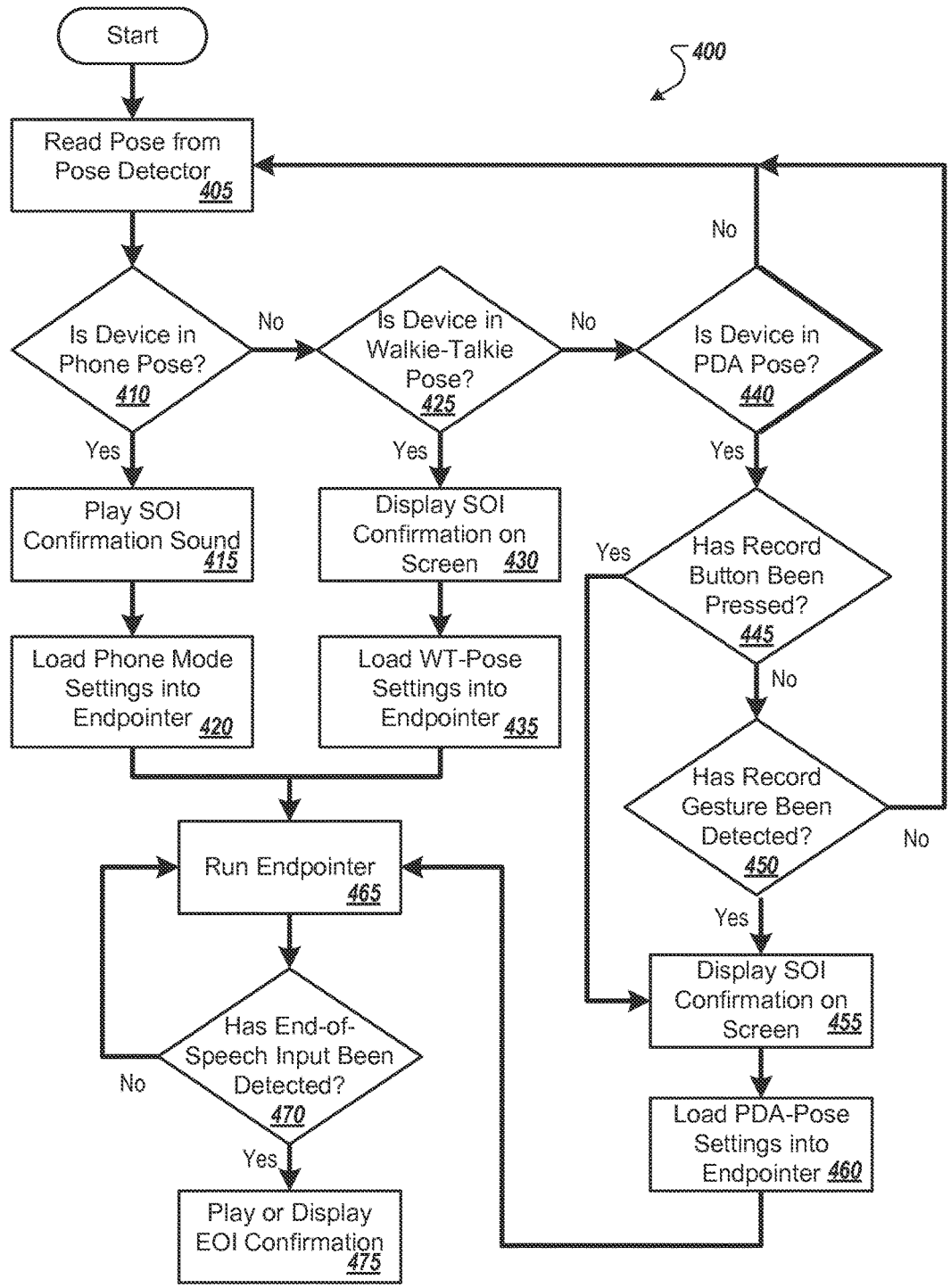
FIG. 4 illustrates an example alternative process of multisensory speech detection.

FIGS. 3 and 4 are flow charts of example processes 300 and 400, respectively, for multisensory speech detection. The processes 300 and 400 may be performed, for example, by a system such as the system shown in FIG. 2 and, for clarity of presentation, the description that follows uses that system as the basis of an example for describing the processes. However, another system, or combination of systems, may be used to perform the processes 300 and 400.

FIG. 3 illustrates an example process 300 of multisensory speech detection. The process 300 begins at step 305 where it is determined whether a record button has been pressed. For example, as noted above, the mobile devices 205 may include a button that allows a user to initiate or end speech recording by pressing the button. If a button press is detected at step 305 the process 300 may start recording speech and display a start of input (SOI) confirmation that recording has started at step 315. For example, the device 205 may execute a recording program stored in memory when the button is pressed. In addition, the device 205 may display a message on the screen indicating that recording has begun. In some implementations, the device 205 may vibrate or play a tone, in addition to, or in lieu of, display an on-screen confirmation.

However, if a record button press is not detected at step 305, the process 300 can proceed to step 310 where it is determined whether a record gesture has been detected. For example, a user may be holding the device 205 in PDA pose. When the user brings the device 205 to his mouth, the gesture classifier 225 may classify this motion as a "to-mouth" gesture and cause the device 205 to execute a recording application. In some implementations, other gestures such as shaking or flipping the phone can be a record gesture. In response, the process 300 may proceed to step 315 where a recording process is started and a recording confirmation is displayed as described above. If not, the process 300 may return to step 305 where it determines if a record button has been pressed.

The process 300 may load settings into an endpointer at step 320. In some cases, the device 205 may load pose-specific speech detection parameters such as a speech energy threshold that can be used to detect speech. For example, in some cases, the speech energy threshold for a pose may be compared to detected auditory information. If the auditory information is greater than the speech energy threshold, this may indicate that a user is speaking to the device. In some implementations, poses may have an associated speech energy threshold that is based on the distance between the device 205 and a user when the device is in the specified pose. For instance, the device 205 may be closer to a user in telephone pose than it is in PDA pose. Accordingly, the speech energy threshold may be lower for the PDA pose than it is for the telephone pose because the user's mouth is farther from the device 205 in PDA pose.

At step 325, an endpointer may run. For example, device 205 may execute endpointer 229. In response, the endpointer 229 can use parameters loaded at step 320 to determine whether the user is speaking to the device, and related events, such as the start and end of speech. For example, the endpointer 229 may use a speech energy threshold, along with inputs from the pose identifier 227, speech detector 221, and speaker identifier 223 to determine whether the user is speaking and, if so, whether the speech is beginning or ending.

At step 330, an end-of-speech input may be detected. As discussed above, the endpointer 229 may determine whether speech has ended using inputs from other device components and a speech energy threshold. If the end of speech input has been detected, recording may cease and an end of input (EOI) display indicating that recording has ended may be provided at step 335. For example, a message may appear on the screen of the device 205 or a sound may be played. In some cases, tactile feedback (e.g., a vibration) may be provided.

FIG. 4 illustrates an example alternative process 400 of multisensory speech detection. The process begins at step 405 where a pose is read from a pose detector. For example, the pose identifier 227 may provide the current pose of the device, or an indication of the current pose may be read from memory 231.

At step 410, it is determined whether the device 205 is in phone pose. For example, the pose identifier 227 can use inputs from the proximity sensor 215 and the gesture classifier 225 to determine if the device is in phone pose. In some cases, the pose of the device can be identified by determining how far the device is from the user and whether the device is within a set of predetermined angles. If the device 205 is in phone pose, a sound confirming that recording has begun may be played at step 415. In some implementations, another type of feedback (e.g., a vibration or a display of a message) may be provided with, or instead of, the audio confirmation.

At step 420, phone pose settings may be loaded into an endpointer. For example, a speech energy threshold associated with the phone pose may be read from memory 231 into the endpointer 229.

Similarly, at step 425 it is determined whether the device is in walkie-talkie pose. As noted above, the pose identifier 227 can use inputs from the gesture classifier 225 and the proximity sensor 215 to determine the pose of the device. If the device is in walkie-talkie pose, confirmation that recording has begun may be displayed on the screen (in some cases, confirmation may also be tactile or auditory) at step 430 and walk-talkie pose settings may be loaded into an endpointer at step 435.

At step 440, it is determined whether the device is in PDA pose. In some cases, the pose of the device can be determined as described in regards to steps 410 and 425 above. If the device is not in PDA pose, the method can return to step 405. If the device is in PDA pose, it can be determined whether a record button has been pressed at step 445. If a record button has not been pressed, the method proceeds to step 450, where it is determined if a record gesture has been detected. For example, as discussed in relation to step 310 of FIG. 3 above, the device 205 may detect a movement of the device 205 toward a user's mouth. In some cases, the device 205 may interpret this motion as a record gesture.

If a record button was pressed at step 445 or a record gesture was detected at step 450, a message confirming that recording has begun can be displayed on the screen of the device 205 at step 455. In some cases, the device 205 may vibrate or play a sound to indicate that recording has started. Subsequently, settings associated with the PDA pose may be loaded into an endpointer at step 460. For example, a speech energy threshold may be loaded into the endpointer 229.

For each of the poses described above, after the appropriate pose settings are read into an endpointer, the endpointer may be run at step 465. For example, a processor 233 associated with the device 205 may execute instructions stored in memory that correspond to the endpointer 229. Once the endpointer 229 has begun executing, the endpointer 229 may determine whether an end-of-speech input has been detected at step 470. For example, the endpointer 229 may determine whether an end-of-speech input has been detected using outputs from the pose identifier 227, speech detector 221, speaker identifier 223, and parameters associated with the pose that have been loaded into the endpointer 229. For example, the endpointer 229 may determine when the device 205 is no longer in one of the specified poses using outputs from the previously mentioned sources. At step 475, the process may play or display a confirmation that speech recording has ceased. For example, an end-of-recording message may be displayed on the device's 205 screen or a sound may be played. In some cases, the device 205 may vibrate.

Figure 5A:
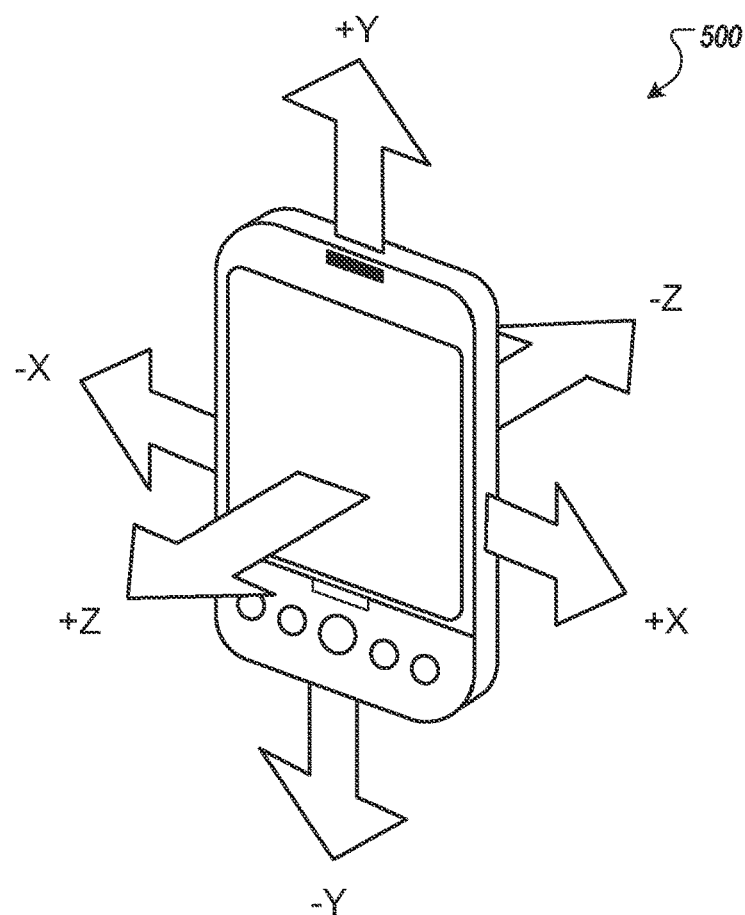
FIGS. 5A and 5B illustrate coordinate systems for gesture recognition.
Figure 5B:
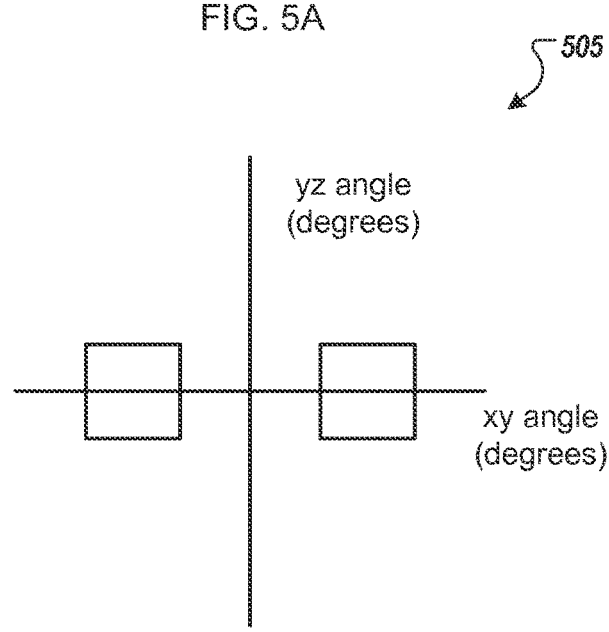

FIGS. 5A and 5B show example coordinate systems 500 and 505 for gesture recognition. FIG. 5A shows an illustrative Cartesian coordinate system 500 for a mobile device. The illustrative coordinate system 500 can be a three-dimensional coordinate system with X-, Y-, and Z-axes as shown in FIG. 5A. In some cases, an accelerometer (such as the accelerometer 213 shown in FIG. 2) can be used to determine an angle of the mobile device in the coordinate system shown in FIG. 5A. The determined angle can, in turn, be used to determine a pose of the device.

For example, acceleration data provided by the accelerometer 213 may be smoothed by, for instance, using a digital filter (e.g., an infinite impulse response filter). In some cases, the accelerometer may have a sample frequency of 10 Hz. In addition, the infinite impulse response filter may have a filtering factor of 0.6. The magnitude of the instantaneous acceleration may be calculated from the residual of the filter. A resulting gravity vector may be projected onto XY and YZ planes of the coordinate system and the angle subtended by the projected components may be calculated using the inverse tangent of the components. The resulting two angles can be projected onto a new plane such as the one shown in FIG. 5B and critical angle bounding boxes 510 and 515 can be defined around the left and right hand positions of the phone to a user's ear. As described in further detail below, these bounding boxes can be used to detect gestures, among other things.

Figure 6:
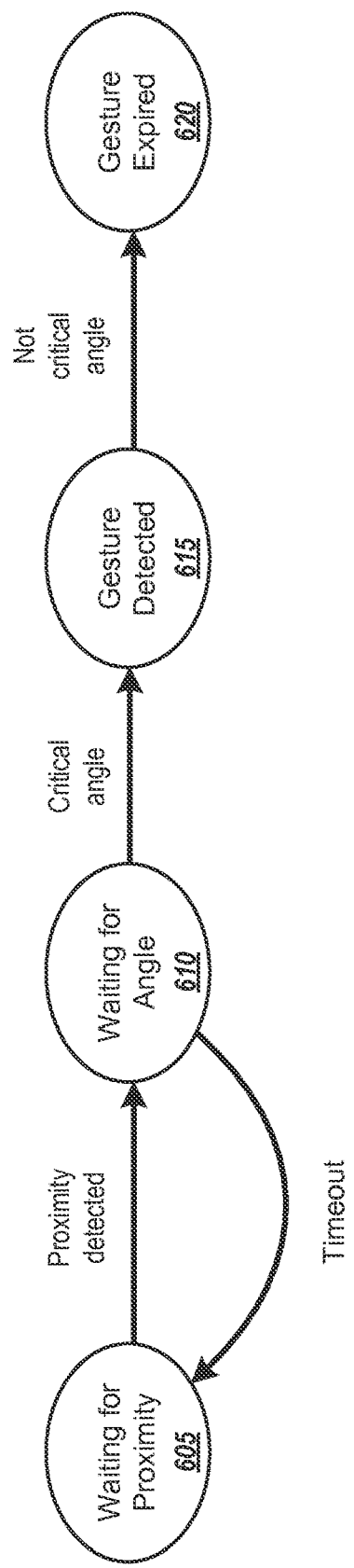
FIG. 6 is an example state machine for gesture recognition.

FIG. 6 is an example state machine 600 for gesture recognition. The state machine 600 can use the critical angle bounding boxes described above, along with proximity information, to classify gestures. The illustrative state machine can be clocked by several events: a specified proximity being detected, the device 205 being within a critical set of angles, or a time expiring. For example, the illustrative state machine can wait for a predetermined proximity to be detected at state 605. In some cases, the state machine 600 may activate the proximity sensor 215 when either the instantaneous acceleration of the device is greater than a threshold or the device 205 is placed at a set of critical angles. In some cases, the critical angles may be angles that fall within the bounding boxes shown in FIG. 5B. For example, the left-most bounding box 510 may include angles between −80 and −20 degrees in the XY plane and −40 and 30 degrees in the YZ plane. Similarly, bounding box 515 may include angles between 20 and 80 degrees in the XY plane and −40 and 30 degrees in the YZ plane.

If the proximity sensor detects an object within a preset distance of the device 205, the state machine 600 transitions to state 610 where it waits for an angle. In some cases, if the proximity sensor 215 detects a user within the predetermined distance and the device 205 was previously determined to be at the critical angles (e.g., the state machine was activated because the device 205 was placed at the critical angles) the state machine 600 transitions to the next state 615. If the device 205 was not previously placed at the critical angles, the device 205 may wait for a preset period for the device to be placed at the critical angles; this preset period may allow any acceleration noise to settle. In some cases, the preset period may be one second. If the device is not placed at the critical angles within the predetermined period, the state machine 600 may transition back to state 605. However, if the device 205 is detected at the critical angles within the predetermined threshold the state machine transitions to state 615 where a gesture is detected. In some cases, the gesture classifier 225 may classify the detected gesture. For example, the gesture may fall into the following categories: "to mouth," "from mouth," "facing user," "to ear," and "from ear." In some implementations, other categories may be defined. If the device 205 is determined to no longer be at the critical angles, the state machine 600 may transition to state 620, where the gesture has expired. In some implementations, a minimum debounce period may prevent this transition from happening because of angle bounce. For example, the minimum debounce period may be 1.7 seconds.

Figure 7:
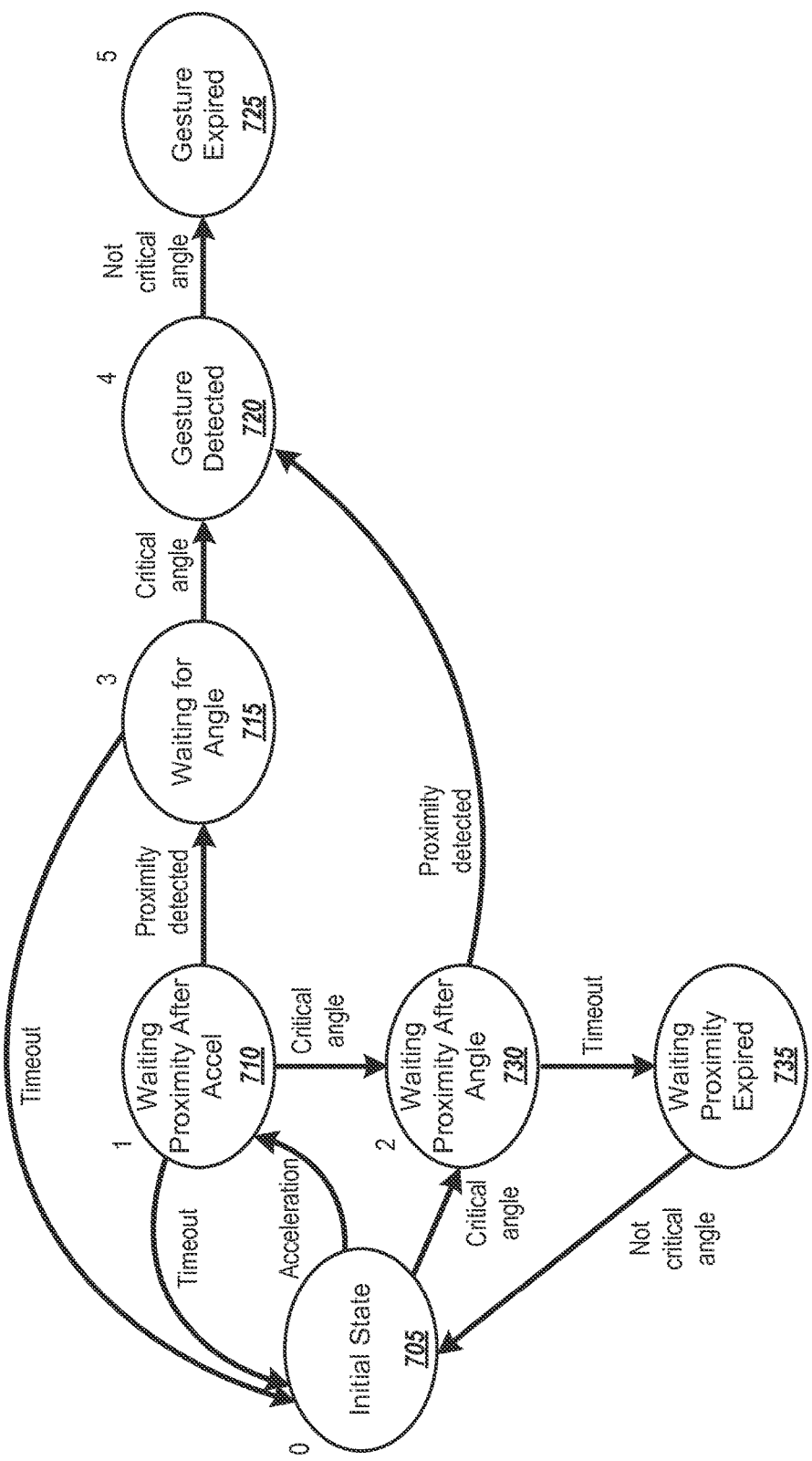
FIG. 7 illustrates another implementation of a state machine for gesture recognition.

FIG. 7 illustrates another implementation of a state machine 700 for gesture recognition. FIG. 7 shows the illustrative state machine 700 responding to variations in gestures, where the gestures vary according to the detected acceleration (e.g., slow, medium, and fast gestures). The illustrative state machine 700 may be useful in implementations where the device 205 includes a proximity sensor 215 that does not detect a proximate condition if the proximity sensor 215 is activated when the device 205 is already proximate a surface or where activation of the proximity detector may trigger other actions such as switching off the screen. In some cases, to address this issue, the proximity sensor 215 may be activated when an instantaneous acceleration surpasses a threshold. In some cases, the proximity sensor 215 may be activated when the sensor 215 crosses the instantaneous acceleration across all axes.

The state machine 700 begins in an initial state 705. If an acceleration above a threshold is detected, the machine 700 transitions to state 710 where it waits for proximity detection after the detected acceleration. In some implementations, the acceleration threshold may be 0.6 g. In some cases, the wait may be 0.5 seconds. If the device 205 is proximate an object such as a user, the state machine 700 transitions to state 715 where it waits a predetermined time for the device to placed at the critical angles. In some cases, the wait may be one second. If the device is not placed at the critical angles within the specified time, the state machine returns to its initial state 705. However, if the device is placed at the critical angles, the state machine 700 transitions to state 720 where a gesture is detected in the manner described above. When the device is no longer within the critical angles, the state machine 700 transitions to state 725 where the gesture has expired. These transitions may correspond to a fast gesture.

In some cases, after acceleration has been detected, the device 205 may be placed in critical angles and, as such, the state machine 700 can proceed to state 730, where it waits for a proximity detection. If no proximity detection is made within a preset time, the state machine 700 can transition to state 735 where the waiting proximity time has expired and subsequently return to its initial state 705. In some cases, the preset time may be one second. However, if a proximity detection is made before the preset time expires, the state machine 700 can transition to states 720 and 725 as described above. In some cases, this series of transitions may correspond to a medium-speed gesture.

If the state machine 700 is in its initial state 705 and the device 205 has been placed at the critical angles the state machine 700 can transition to state 730 where the state machine 700 waits for proximity detection. If proximity detection occurs before a timeout period, the state machine 700 proceeds to state 720 where a gesture is detected. If the device 205 is moved from the critical angles, the state machine 700 transitions to state 725 where the gesture has expired. This series of transitions may correspond to a gesture made at relatively slow pace.

Figure 8A:
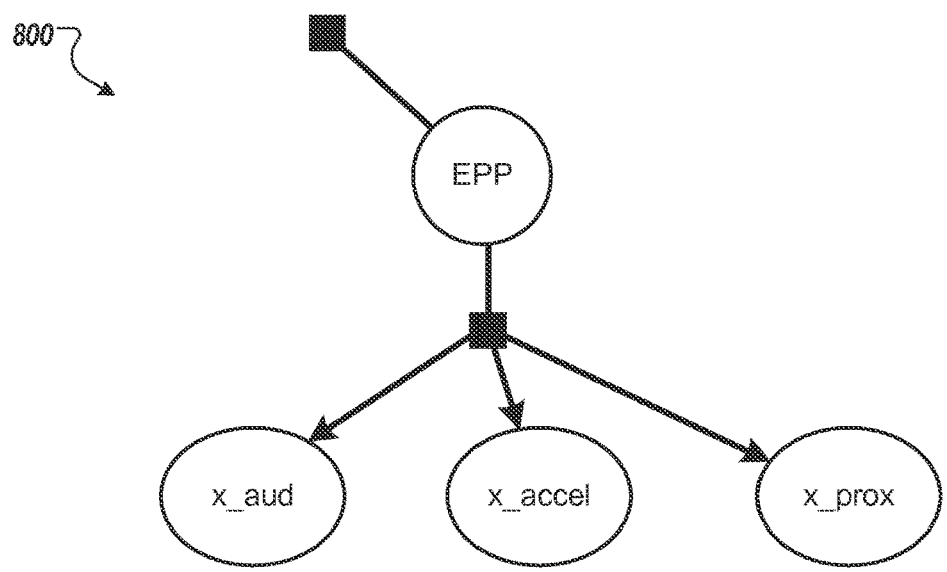
FIGS. 8A and 8B illustrate Bayes nets for pose and speech detection.
Figure 8B:
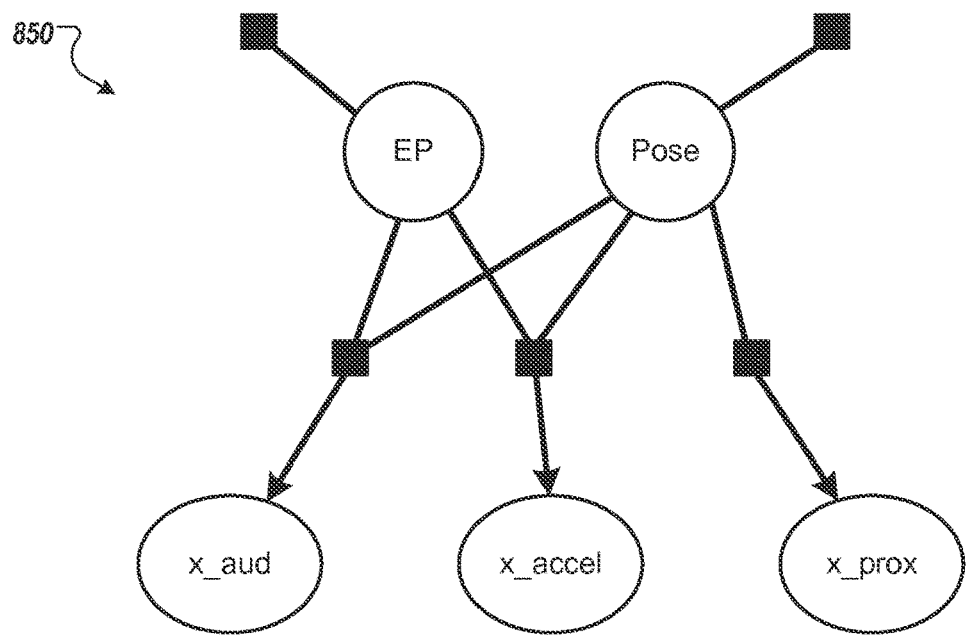

FIGS. 8A and 8B illustrate Bayes nets for pose and speech detection. In some cases, a Bayesian network 800 may be used to recognize gestures. Outputs from a proximity sensor 215, accelerometer 213, and speech detector 221 can be combined into a Bayesian network as shown in FIG. 8A. The Bayesian network 800 shown in FIG. 8A can represent the following distribution:

$$p(x\_aud, x\_accel, x\_prox | EPP) p(EPP) \quad (1)$$

In equation (1), x_aud can represent an audio feature vector, x_accel can represent acceleration feature vector, and x_prox can represent a proximity feature vector. A hidden state variable, EPP, can represent a cross product of an endpointer speech EP and a pose state variable Pose. The EP and Pose variables can be discrete random variables.

FIG. 8B illustrates a factorization 850 of the hidden state into the EP vector and the Pose state variable. This factorization can facilitate better use of training data and faster inference. The distribution can be factored as follows:

$$p(x\_aud | EP, Pose) p(x\_accel | EP, Pose) p(x\_prox | Pose) p(EP) p(Pose) \quad (2)$$

In some cases, the distributions p(x_aud, x_accel|EP, Pose) and p(x_aud, x_accel|EP, Pose) and p (x_prox|Pose) can be Gaussian Mixture Models.

Figure 9:
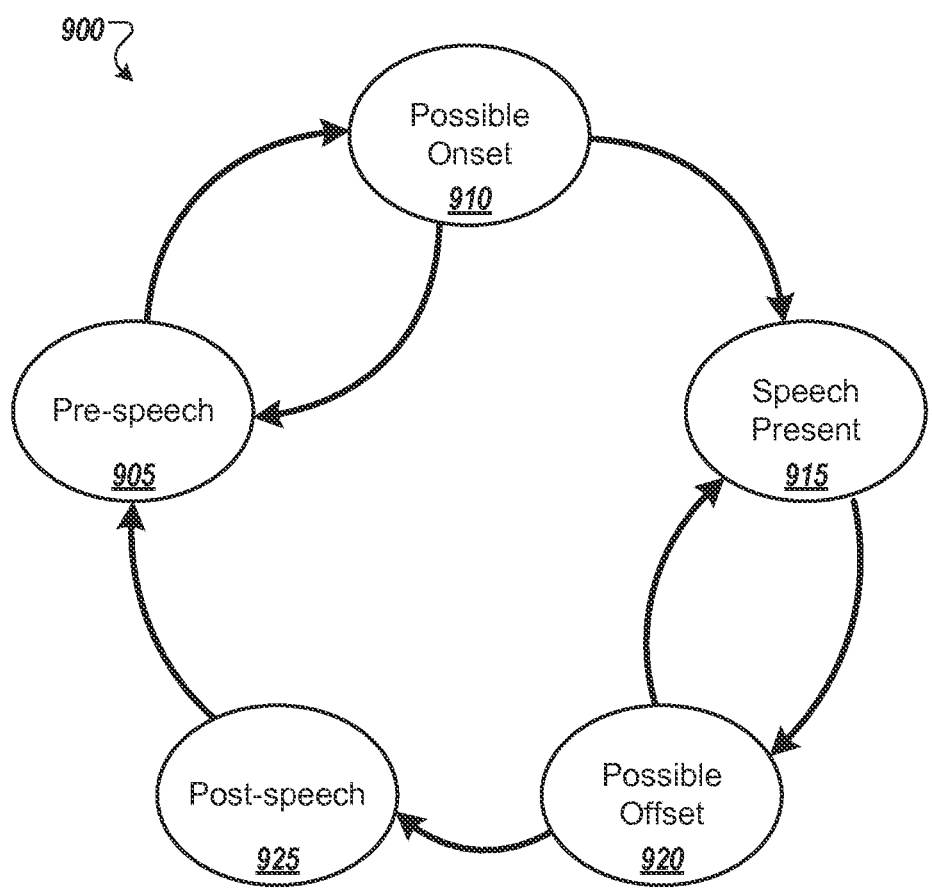
FIG. 9 illustrates an endpointer state machine.

In some implementations, the posterior probability for EP can be used as input to an endpointer state machine. For example, FIG. 9 illustrates an endpointer state machine 900. In the illustrative implementation shown in FIG. 9, an EP posterior probability can be thresholded and a time frame may be determined to contain either noise or speech. In this example, noise may be represented by a zero value and speech can be represented by a one value. A circular buffer of thresholded values may be stored. A one value in a buffer can be used to drive the endpointer state machine shown in FIG. 9. For example, if the initial state 905 is pre-speech and the number of one values in the circular buffer exceeds a threshold, the machine moves to state 910 "Possible Onset." If the number of one values fall below the threshold the machine moves back to the "Pre-Speech" state 905. The state machine 900 can transition backward and forward among the "Speech Present" 915, "Possible Offset" 920 and "Post Speech" 925 states in a similar fashion.

Figure 10:
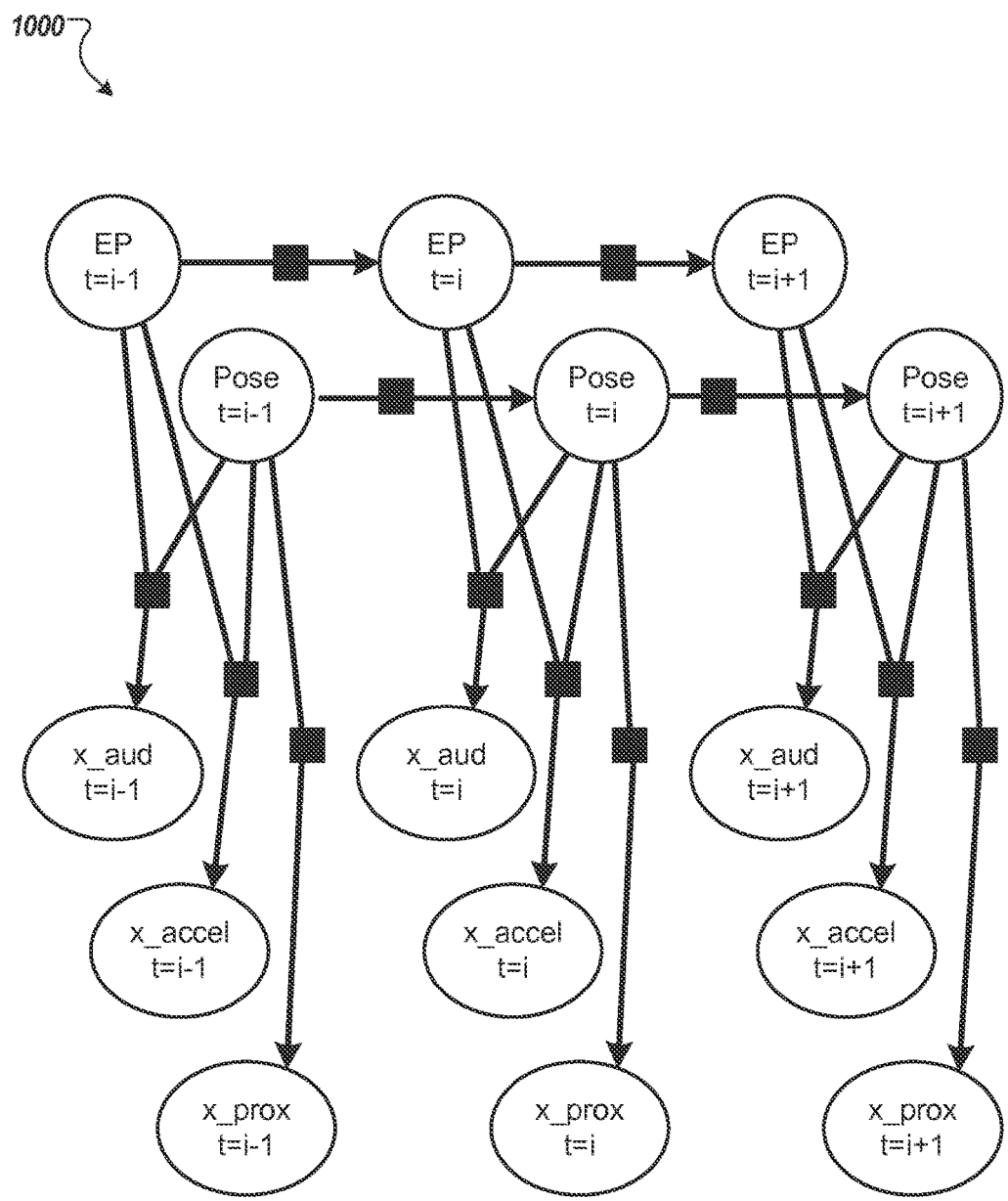
FIG. 10 illustrates a dynamic Bayes net for pose and speech detection.

FIG. 10 illustrates a dynamic Bayes net for pose and speech detection. FIG. 10 shows a collection of EPP states chained together in a Hidden Markov Model 1000. In the illustrative implementation, the State EPP can be a cross product of EP state and the Pose state and transitions between the states can be defined by a transition matrix. The illustrative gesture recognizer in FIG. 10 can be trained by employing an Expectation Maximization algorithm. Inference to determine a speech/noise state can be performed by the Viterbi algorithm or a Forward-Backward algorithm. In some cases, more complex states can be used. For instance the environment of the user (e.g., in the street, in a home, in a moving car, in a restaurant, etc.) or device could be inferred based upon signals from the sensors and used in the determination of the pose and endpointer state.

Figure 11:
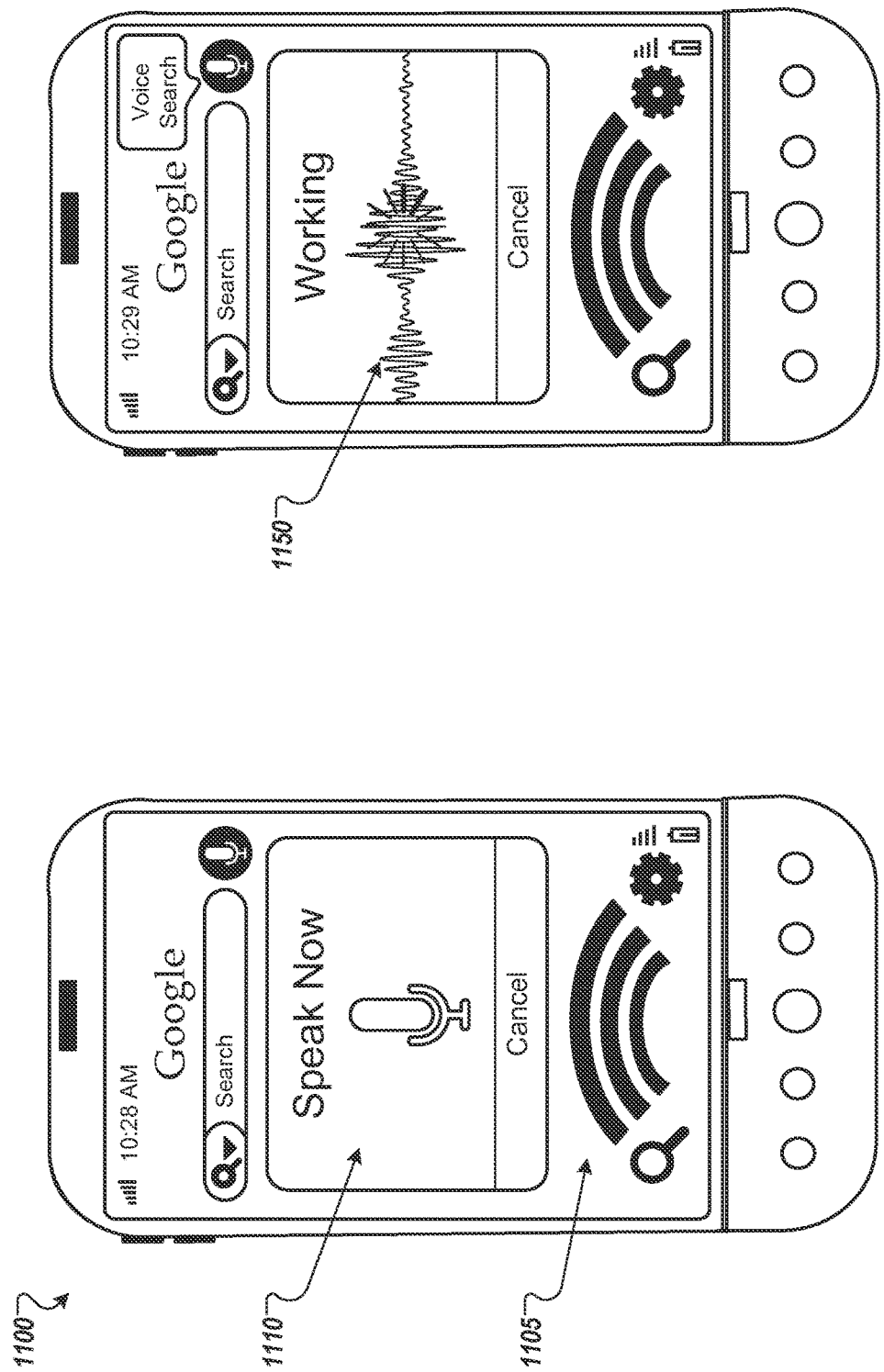
FIGS. 11-12 show screenshots of an example graphical user interface for providing feedback about audio signal quality.
Figure 12:
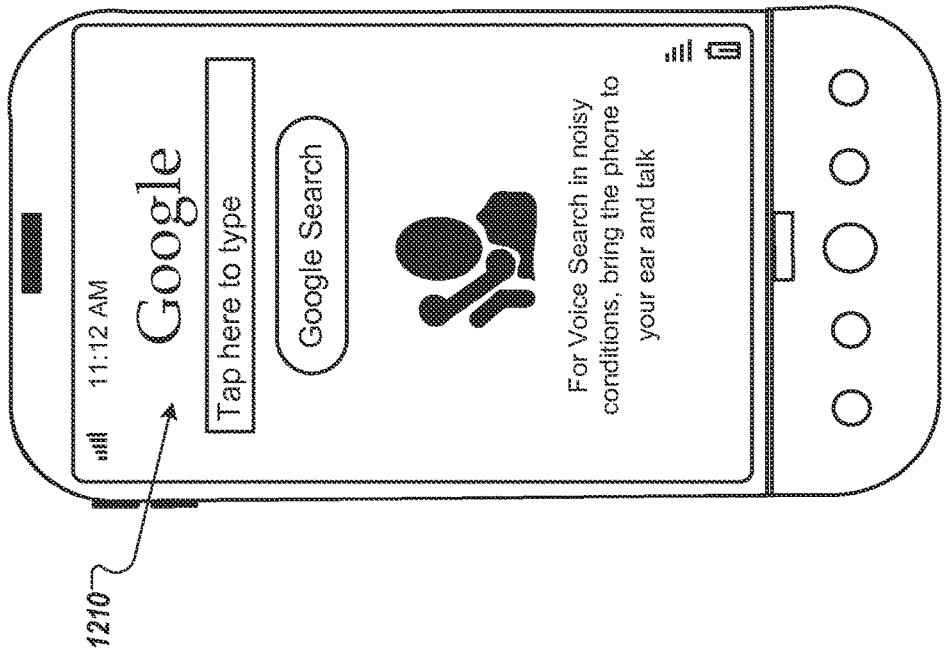
Figure 12:
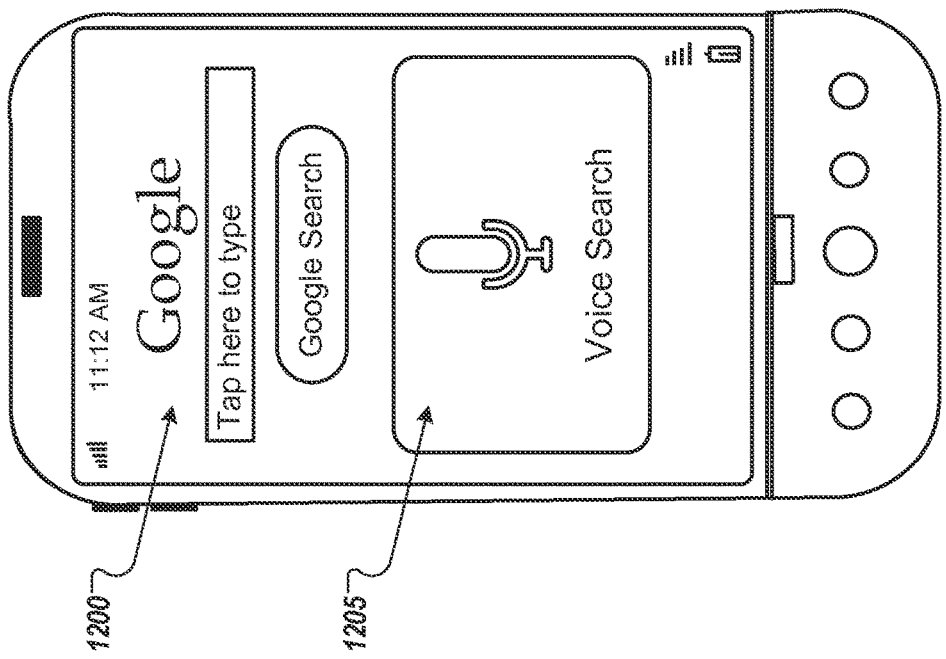

FIGS. 11-12 show screenshots of an example graphical user interface for providing feedback about audio signal quality. In some implementations, the illustrative graphical user interface may provide feedback regarding audio signal quality before, during, and after a user speaks commands into a mobile computing device. For example, before a user speaks, the graphical user interface can provide visual or audio feedback that may indicate whether speech will be accurately captured by the device. In some cases, the feedback may indicate that the user should use the device in a particular manner (e.g., place the device in a particular pose) or warn the user that background noise may impair the detection and accurate recording of speech. In some implementations, the feedback may be used to limit the modes of operation available to the user or suggest an operating mode that may increase the chance of successful voice capture.

In some cases, as the user is speaking the graphical user interface can provide feedback on the quality of the audio captured by the device. For example, a visual indication of the amplitude of the recorded audio can be displayed on the screen while the user is speaking. This may provide the user an indication of whether background noise is interfering with sound recording or whether the user's commands are being properly recorded. After the user has finished speaking, the graphical user interface may display a representation of the captured voice commands to the user.

FIG. 11 shows an illustrative graphical user interface 1100 for providing feedback about audio signal quality. The illustrative graphical user interface 1100 can, in some cases, include a message area 1105. Visual indicators such as text and waveforms may be displayed in the message area 1105 to indicate, for example, a mode of operation of the device or a representation of recorded audio. For example, as shown in FIG. 11, when the device is in a recording mode, a "Speak Now" message may be displayed in the message area 1110. Messages indicating that current noise conditions may interfere with speech recording may be displayed in message area 1105. In some situations, the message area 1105 may also show messages allowing a user to continue or cancel the recording operation. The preceding examples are illustrative; other types of data may be displayed in the message area 1105.

The illustrative graphical user interface 1100 can also include a visual audio level indicator 1110. In an illustrative implementation, the visual audio level indicator 1110 can indicate the amplitude of audio captured by a mobile device. For example, as a user is speaking the indicator 1110 can go up an amount related to the amplitude of the detected speech. In some circumstances, the indicator 1110 may allow a user to determine whether background noise is interfering with speech recording. For example, if the indicator 1110 goes up before the user begins speaking, background noise may interfere with speech recording. If the indicator 1110 does not go up while the user is speaking, this may indicate the user's voice commands are not being properly recorded.

In some cases, the audio level indicator 1110 can display a representation of the log of the Root Means Square (RMS) level of a frame of audio samples. The log RMS level of the frame of audio samples may represent a background noise level. In some cases, the RMS value may be equal to $$\sqrt{\sum_0^t x_t^2}.$$

In some cases, the log RMS level of a frame of audio samples may be determined by the following equation:

$$AL = 20 * \log_{10}(RMS) \quad (3)$$

Here, $x_t$ can be an audio sample value at a time t.

In some cases, audio level indicator 1110 may display a representation of a signal-to-noise ratio; i.e., strength of a speech signal relative to background noise. For example, the signal-to-noise ratio can be calculated using the following equation:

$$AL_{SNR} = 20 * \log_{10}\left(\frac{RMS}{NL}\right) \quad (4)$$

Like equation (3), $x_t$ can be an audio sample value at a time t, while NL can be an estimate of a noise level.

In an alternative implementation, the audio level indicator 1110 can display a representation of a combination of the log RMS level of a frame of audio samples and a signal-to-noise ratio. For example, this combination can be determined as follows:

$$L = \alpha(AL) + \beta(AL_{SNR}) \quad (5)$$

In this equation, $\alpha$ and $\beta$ can be variables that can scale the background noise and signal-to-noise. For example, a can scale the RMS level of a frame of audio samples to represent decibel values (e.g., such that 100 db equals a full scale RMS level of a frame of audio). $\beta$ can used to scale a signal-to-noise ratio in a similar fashion.

In some implementations, one or more of the background noise level, signal-to-noise ratio, or a combination of the two can be displayed on the graphical user interface 1100. For example, one or more of these measures may be displayed on the screen in different colors or in different areas of the screen. In some cases, one of these measures may be superimposed on one of the others. For example, data representing a signal-to-noise ratio may be superimposed on data representing a background noise level.

FIG. 11 also illustrates an example graphical user interface that includes visual waveform indicator 1150. The illustrative visual waveform indicator 1150 can show a captured audio signal to a user. The waveform may, in some cases, be a stylized representation of the captured audio that represents an envelope of the speech waveform. In other cases, the waveform may represent a sampled version of the analog audio waveform.

The illustrative waveform may permit the user to recognize when a device has failed to record audio. For example, after a user has spoken an voice command, the application can show a waveform that represents the captured audio. If the waveform is a flat line, this may indicate that no audio was recorded.

FIG. 12 illustrates an example graphical user interface in different operating conditions. In some cases, it may be useful to adjust the options for interacting with a mobile device based on a level of background noise. For example, a user may want to enter voice commands into a mobile device. Depending on the background noise level, the user may need to hold the device close to his mouth for voice commands to be recognized by the device. However, in quieter situations the user may be able to hold the device at arm's length and enter voice commands. The illustrative graphical user interface may present a user with an interaction option based on the probability that the device can correctly recognize a voice command given a detected level of background noise. For example, as shown in FIG. 12, in quiet conditions a graphical user interface may present a voice search option, represented by the graphical voice search button 1205. In circumstances where the background noise level is high, the voice search button 1205 can be removed and a message indicating that the mobile device should be placed closer to the user's mouth may be displayed, as shown by the right-most image of the graphical user interface 1210. By holding the device closer to the user (e.g., holding the device in telephone pose), speech power may be increased by 15-20 decibels, making correct speech recognition more likely.

Figure 13:
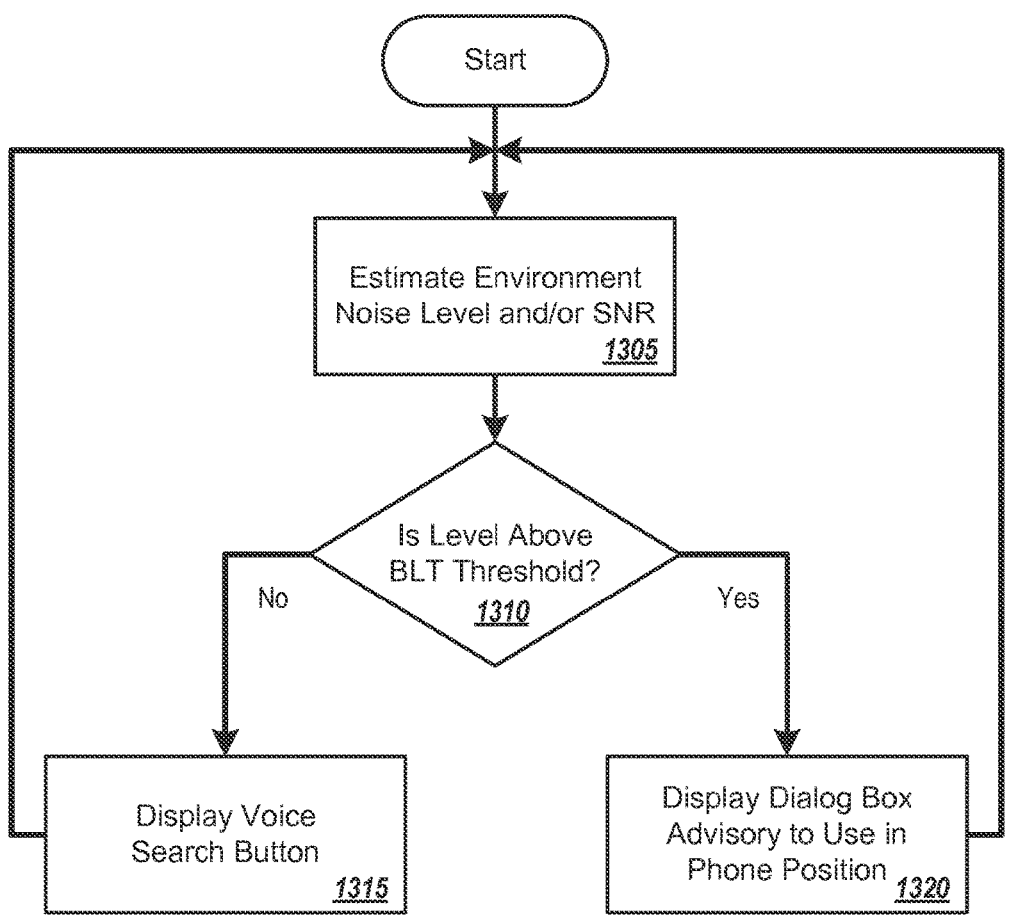
FIG. 13 illustrates an example process for background noise based mode selection.
Figure 14:
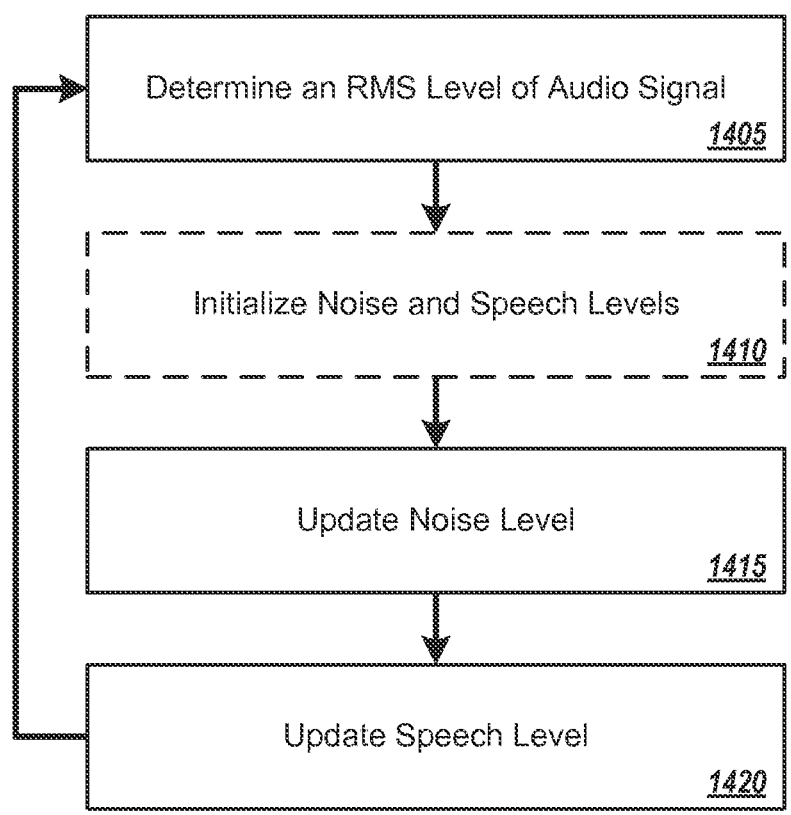
FIG. 14 shows an illustrative method of background noise level estimation.

FIGS. 13 and 14 are flow charts of an example processes 1300 and 1400 for background noise based mode selection. The processes 1300 and 1400 may be performed, for example, by a system such as the system shown in FIG. 2 and, for clarity of presentation, the description that follows uses that system as the basis of an example for describing the processes. However, another system, or combination of systems, may be used to perform the processes 1300 and 1400.

FIG. 13 illustrates an example process 1300 for background noise based mode selection. The example process 1300 being at step 1305 where environmental noise and/or a signal-to-noise ratio are estimated. For example, environmental noise and signal-to-noise ratio can be calculated using equations (3) and (4) above. At step 1310 it is determined whether the environmental (i.e., background) noise and/or a signal-to-noise ratio are above a background noise level threshold value. For example, in one implementation, a device 205 may send an acoustic signal, as well as noise and speech level estimates and other environment-related parameters to a server. The server may determine whether the estimated noise and speech level estimates are above a background noise level threshold value. The background noise level threshold value may be based on prior noise and speech level estimates, environment-related parameters, and acoustic level signals sent to the server.

In some cases, the device 205 can correlate a particular noise level or type of environmental sound to recognition accuracy. For example, a noise level (NL) of 40 dB fan noise may correspond to a word error rate (WER) of 20%, while the WER might be 50% when the noise is 70 dB (assuming the user speaks at 80 dB on average). These values may be transmitted to a server (e.g., remote device 245) that can collect statistics to make a table from NL to WER.

Some noise types may be worse than others. For example, 50 dB cafeteria noise might have the same WER as 70 dB fan noise. The device 205 can perform environment characterization of this type by sending the audio to a server (such as remote device 245) for mode determination.

If the background noise and/or signal-to-noise ratio is above the background level threshold, the process proceeds to step 1315 where a voice search button is displayed as shown in FIG. 12. If not, a dialog box or message may be displayed advising a user to use the device 205 in phone position at step 1320. Regardless, the method returns to 1305 after step 1315 or step 1320.

FIG. 14 shows an illustrative method 1400 of background noise level estimation. The method 1400 begins at step 1405 where an RMS level of an audio sample is determined. For example, a microphone 217 can be used to capture a frame of audio signals (e.g., 20 milliseconds of audio) from the environment surrounding the mobile device 205. The RMS level of the frame can be determined according to equation (3) above.

Optionally, at step 1410 noise and speech levels may be initialized. For instance, if noise and speech levels have not already been set (as may be the case when the method 1400 is executed for the first time) noise and speech levels may be initialized using an RMS level of an audio sample. In an illustrative example, the noise and speech levels may be set using the following equations:

$$NL=(\alpha*NL)+((1-\alpha)*RMS) \quad (6)$$

$$SL=(\alpha*NL)+((1-\alpha)*2RMS) \quad (7)$$

In equations (6) and (7), RMS can be an RMS level of an audio sample and $\alpha$ is a ratio of a previous estimate of noise or speech and a current estimate of noise or speech. This ratio may be initially set to zero and increase to $$\left(\frac{k-1}{k}\right),$$

where k is a number of time steps in an initial adaptation period.

At step 1415, a noise level may be updated. For example, a noise level can be compared with a RMS level of an audio sample, and the noise level can be adjusted according to the following equation:

$$NL=(\text{UpdateRate}_{NL}*NL)+(\text{UpdateRate}_{RMS}*RMS) \quad (8)$$

Like equation (7), RMS can be an RMS level of an audio sample. In some cases, the sum of UpdateRate$_{NL}$ and UpdateRate$_{RMS}$ can equal one. If the noise level is less than an RMS level of an audio sample, UpdateRate$_{NL}$ may be 0.995, while UpdateRate$_{RMS}$ may be 0.005. If the noise level is greater than the RMS level of an audio sample, the noise level may be adjusted using equation (8), but UpdateRate$_{NL}$ may be 0.95, and UpdateRate$_{RMS}$ may be 0.05.

At step 1430, a speech level may be updated. For example, a speech level can be compared with an RMS level of an audio sample, and the speech sample can be adjusted according to the following equation:

$$SL=(\text{UpdateRate}_{SL}*SL)+(\text{UpdateRate}_{RMS}*RMS) \quad (9)$$

If the speech level is greater than an RMS level of the audio sample, UpdateRate$_{SL}$ may equal 0.995 and UpdateRate$_{RMS}$ can equal 0.005. If the speech level is less than an RMS level of the audio sample, UpdateRate$_{SL}$ may equal 0.995 and UpdateRate$_{RMS}$ can equal 0.005. After the speech level is updated, the method 1400 may return to step 1405.

In some implementations, other background noise level estimation methods may be used. For example, the methods disclosed in the following papers, which are herein incorporated by reference, may be used: "Assessing Local Noise Level Estimation Methods: Application to Noise Robust ASR" Christophe Ris, Stephane Dupont. Speech Communication, 34 (2001) 141-158; "DySANA: Dynamic Speech and Noise Adaptation for Voice Activity Detection" Ron J. Weiss, Trausti Kristjansson, ICASSP 2008; "Noise estimation techniques for robust speech recognition" H. G. Hirsch, C Ehrlicher, Proc. IEEE Internat. Conf. Audio, Speech Signal Process, v12 i1, 59-67; and "Assessing Local Noise Level Estimation Methods" Stephane Dupont, Christophe Ris, Workshop on Robust Methods For Speech Recognition in Adverse Conditions (Nokia, COST249, IEEE), pages 115-118, Tampere, Finland, May 1999.

Figure 15:
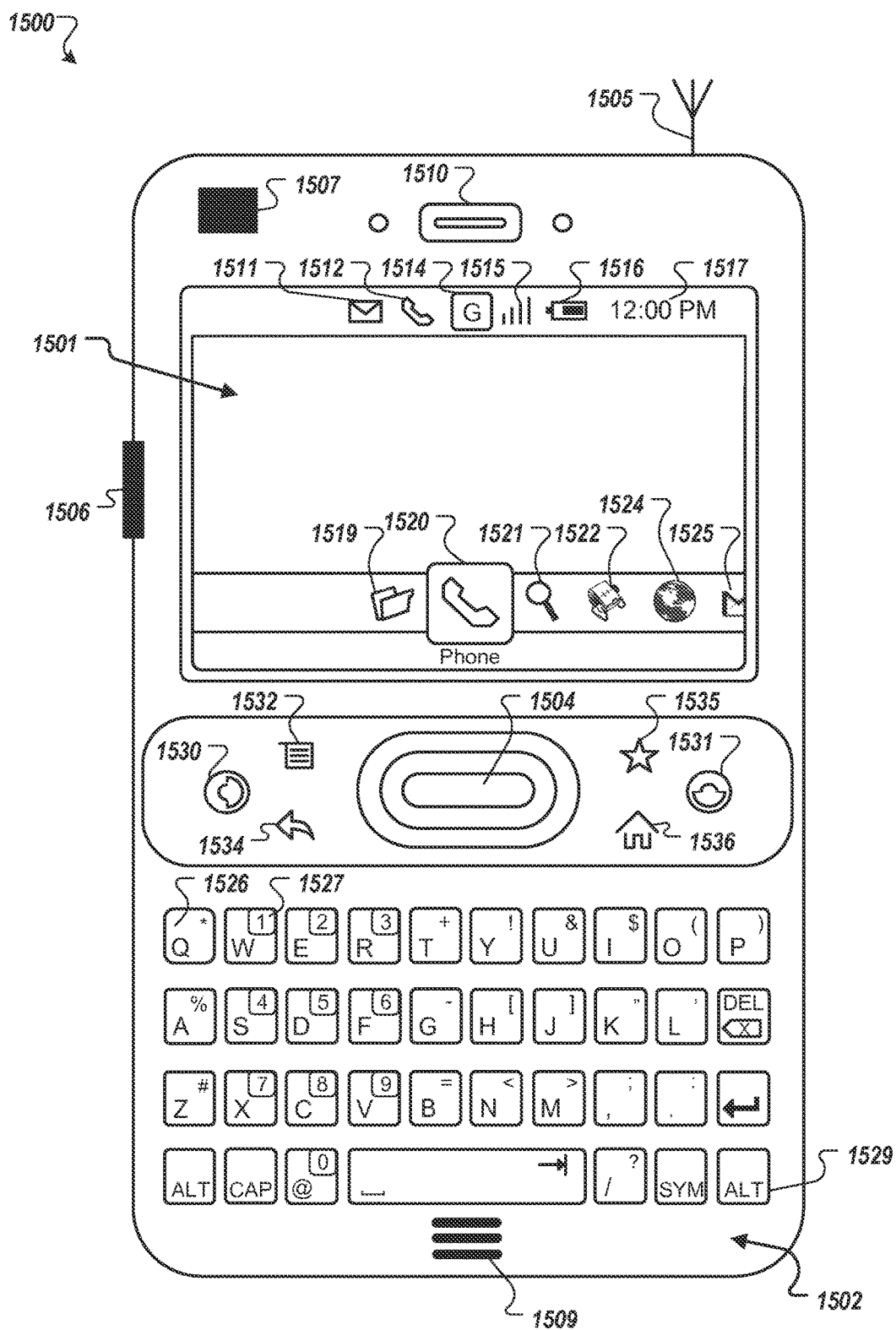
FIG. 15 is a schematic representation of an exemplary mobile device that implements embodiments of the multi-sensory speech detection method described herein.

Referring now to FIG. 15, the exterior appearance of an exemplary device 1500 that implements the multisensory speech detection methods described above is illustrated. In more detail, the hardware environment of the device 1500 includes a display 1501 for displaying text, images, and video to a user; a keyboard 1502 for entering text data and user commands into the device 1500; a pointing device 1504 for pointing, selecting, and adjusting objects displayed on the display 1501; an antenna 1505; a network connection 1506; a camera 1507; a microphone 1509; and a speaker 1510. Although the device 1500 shows an external antenna 1505, the device 1500 can include an internal antenna, which is not visible to the user.

The display 1501 can display video, graphics, images, and text that make up the user interface for the software applications used by the device 1500, and the operating system programs used to operate the device 1500. Among the possible elements that may be displayed on the display 1501 are a new mail indicator 1511 that alerts a user to the presence of a new message; an active call indicator 1512 that indicates that a telephone call is being received, placed, or is occurring; a data standard indicator 1514 that indicates the data standard currently being used by the device 1500 to transmit and receive data; a signal strength indicator 1515 that indicates a measurement of the strength of a signal received by via the antenna 1505, such as by using signal strength bars; a battery life indicator 1516 that indicates a measurement of the remaining battery life; or a clock 1517 that outputs the current time.

The display 1501 may also show application icons representing various applications available to the user, such as a web browser application icon 1519, a phone application icon 1520, a search application icon 1521, a contacts application icon 1522, a mapping application icon 1524, an email application icon 1525, or other application icons. In one example implementation, the display 1501 is a quarter video graphics array (QVGA) thin film transistor (TFT) liquid crystal display (LCD), capable of 16-bit or better color.

A user uses the keyboard (or "keypad") 1502 to enter commands and data to operate and control the operating system and applications that provide for multisensory speech detection. The keyboard 1502 includes standard keyboard buttons or keys associated with alphanumeric characters, such as keys 1526 and 1527 that are associated with the alphanumeric characters "Q" and "W" when selected alone, or are associated with the characters "*" and "1" when pressed in combination with key 1529. A single key may also be associated with special characters or functions, including unlabeled functions, based upon the state of the operating system or applications invoked by the operating system. For example, when an application calls for the input of a numeric character, a selection of the key 1527 alone may cause a "1" to be input.

In addition to keys traditionally associated with an alphanumeric keypad, the keyboard 1502 also includes other special function keys, such as an establish call key 1530 that causes a received call to be answered or a new call to be originated; a terminate call key 1531 that causes the termination of an active call; a drop down menu key 1532 that causes a menu to appear within the display 1501; a backward navigation key 1534 that causes a previously accessed network address to be accessed again; a favorites key 1535 that causes an active web page to be placed in a bookmarks folder of favorite sites, or causes a bookmarks folder to appear; a home page key 1536 that causes an application invoked on the device 1500 to navigate to a predetermined network address; or other keys that provide for multiple-way navigation, application selection, and power and volume control.

The user uses the pointing device 1504 to select and adjust graphics and text objects displayed on the display 1501 as part of the interaction with and control of the device 1500 and the applications invoked on the device 1500. The pointing device 1504 is any appropriate type of pointing device, and may be a joystick, a trackball, a touch-pad, a camera, a voice input device, a touch screen device implemented in combination with the display 1501, or any other input device.

The antenna 1505, which can be an external antenna or an internal antenna, is a directional or omni-directional antenna used for the transmission and reception of radiofrequency (RF) signals that implement point-to-point radio communication, wireless local area network (LAN) communication, or location determination. The antenna 1505 may facilitate point-to-point radio communication using the Specialized Mobile Radio (SMR), cellular, or Personal Communication Service (PCS) frequency bands, and may implement the transmission of data using any number or data standards. For example, the antenna 1505 may allow data to be transmitted between the device 1500 and a base station using technologies such as Wireless Broadband (WiBro), Worldwide Interoperability for Microwave ACCess (WiMAX), 10GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285™ transceiver and PM7540™ power management circuit.

The wireless or wired computer network connection 1506 may be a modem connection, a local-area network (LAN) connection including the Ethernet, or a broadband wide-area network (WAN) connection such as a digital subscriber line (DSL), cable high-speed internet connection, dial-up connection, T-1 line, T-10 line, fiber optic connection, or satellite connection. The network connection 1506 may connect to a LAN network, a corporate or government WAN network, the Internet, a telephone network, or other network. The network connection 1506 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 10.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 1506 and the antenna 1505 are integrated into a single component.

The camera 1507 allows the device 1500 to capture digital images, and may be a scanner, a digital still camera, a digital video camera, other digital input device. In one example implementation, the camera 1507 is a 10 mega-pixel (MP) camera that utilizes a complementary metal-oxide semiconductor (CMOS).

The microphone 1509 allows the device 1500 to capture sound, and may be an omni-directional microphone, a unidirectional microphone, a bi-directional microphone, a shotgun microphone, or other type of apparatus that converts sound to an electrical signal. The microphone 1509 may be used to capture sound generated by a user, for example when the user is speaking to another user during a telephone call via the device 1500. Conversely, the speaker 1510 allows the device to convert an electrical signal into sound, such as a voice from another user generated by a telephone application program, or a ring tone generated from a ring tone application program. Furthermore, although the device 1500 is illustrated in FIG. 10 as a handheld device, in further implementations the device 1500 may be a laptop, a workstation, a midrange computer, a mainframe, an embedded system, telephone, desktop PC, a tablet computer, a PDA, or other type of computing device.

Figure 16:
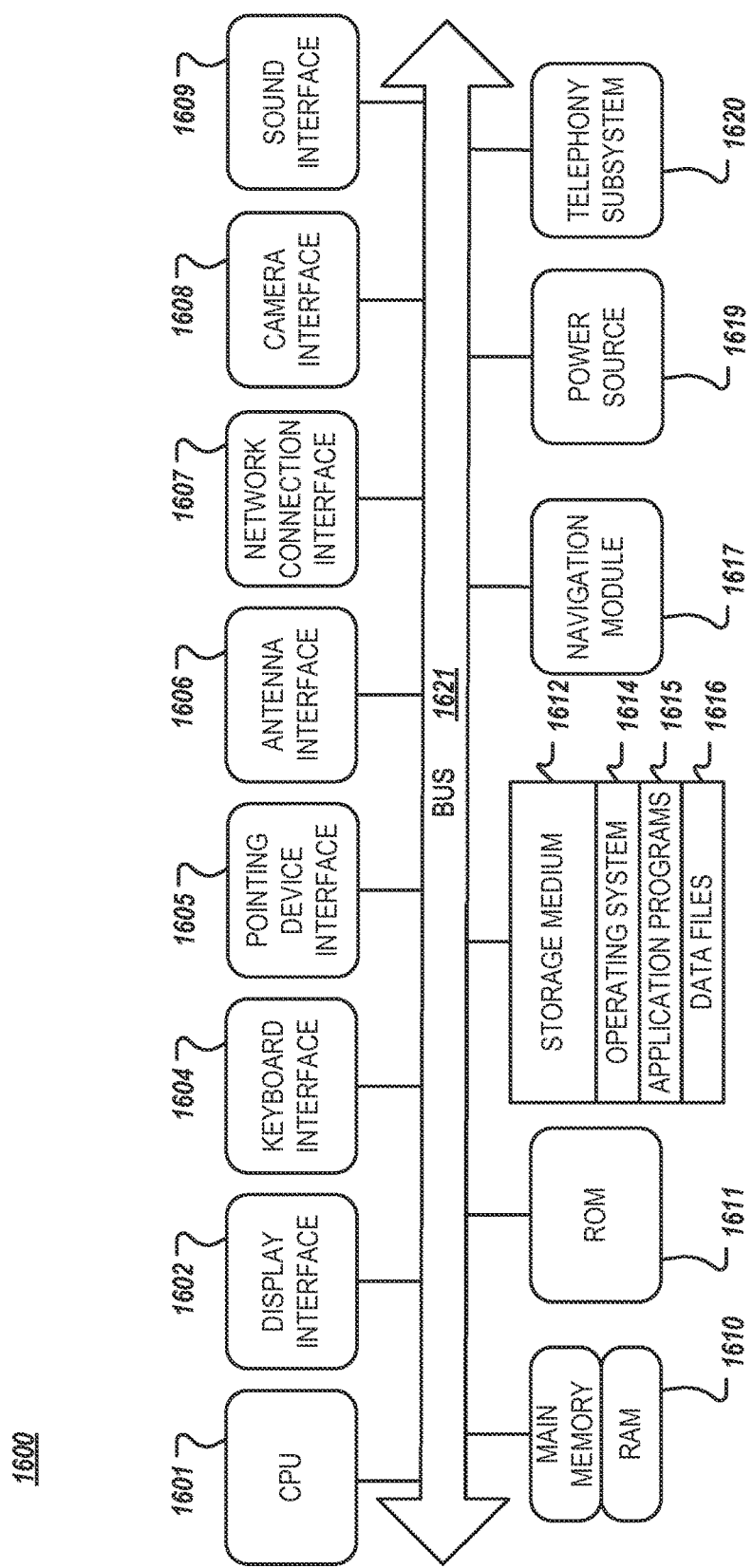
FIG. 16 is a block diagram illustrating the internal architecture of the device of FIG. 15.

FIG. 16 is a block diagram illustrating an internal architecture 1600 of the device 1500. The architecture includes a central processing unit (CPU) 1601 where the computer instructions that comprise an operating system or an application are processed; a display interface 1602 that provides a communication interface and processing functions for rendering video, graphics, images, and texts on the display 1501, provides a set of built-in controls (such as buttons, text and lists), and supports diverse screen sizes; a keyboard interface 1604 that provides a communication interface to the keyboard 1502; a pointing device interface 1605 that provides a communication interface to the pointing device 1504; an antenna interface 1606 that provides a communication interface to the antenna 1505; a network connection interface 1607 that provides a communication interface to a network over the computer network connection 1506; a camera interface 1608 that provides a communication interface and processing functions for capturing digital images from the camera 1507; a sound interface 1609 that provides a communication interface for converting sound into electrical signals using the microphone 1509 and for converting electrical signals into sound using the speaker 1510; a random access memory (RAM) 1610 where computer instructions and data are stored in a volatile memory device for processing by the CPU 1601; a read-only memory (ROM) 1611 where invariant low-level systems code or data for basic system functions such as basic input and output (I/O), startup, or reception of keystrokes from the keyboard 1502 are stored in a non-volatile memory device; a storage medium 1612 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 1614, application programs 1615 (including, for example, a web browser application, a widget or gadget engine, and or other applications, as necessary) and data files 1616 are stored; a navigation module 1617 that provides a real-world or relative position or geographic location of the device 1500; a power source 1619 that provides an appropriate alternating current (AC) or direct current (DC) to power components; and a telephony subsystem 1620 that allows the device 1500 to transmit and receive sound over a telephone network. The constituent devices and the CPU 1601 communicate with each other over a bus 1621.

The CPU 1601 can be one of a number of computer processors. In one arrangement, the computer CPU 1601 is more than one processing unit. The RAM 1610 interfaces with the computer bus 1621 so as to provide quick RAM storage to the CPU 1601 during the execution of software programs such as the operating system application programs, and device drivers. More specifically, the CPU 1601 loads computer-executable process steps from the storage medium 1612 or other media into a field of the RAM 1610 in order to execute software programs. Data is stored in the RAM 1610, where the data is accessed by the computer CPU 1601 during execution. In one example configuration, the device 1500 includes at least 128 MB of RAM, and 256 MB of flash memory.

The storage medium 1612 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 1500 to access computer-executable process steps, application programs and the like, stored on removable and non-removable memory media, to off-load data from the device 1500, or to upload data onto the device 1500.

A computer program product is tangibly embodied in storage medium 1612, a machine-readable storage medium. The computer program product includes instructions that, when read by a machine, operate to cause a data processing apparatus to store image data in the mobile device. In some embodiments, the computer program product includes instructions that perform multisensory speech detection.

The operating system 1614 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 1614 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT .NET Compact, or another appropriate environment.

The device stores computer-executable code for the operating system 1614, and the application programs 1615 such as an email, instant messaging, a video service application, a mapping application, word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 1615 may also include a widget or gadget engine, such as a TAFRI™ widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, the GOOGLE gadget engine, the KLIPFOLIO widget engine, an OPERA™ widget engine, the WIDSETS™ widget engine, a proprietary widget or gadget engine, or other widget or gadget engine that provides host system software for a physically-inspired applet on a desktop.

Although it is possible to provide for multisensory speech detection using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 1617 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 1617 may also be used to measure angular displacement, orientation, or velocity of the device 1500, such as by using one or more accelerometers.

Figure 17:
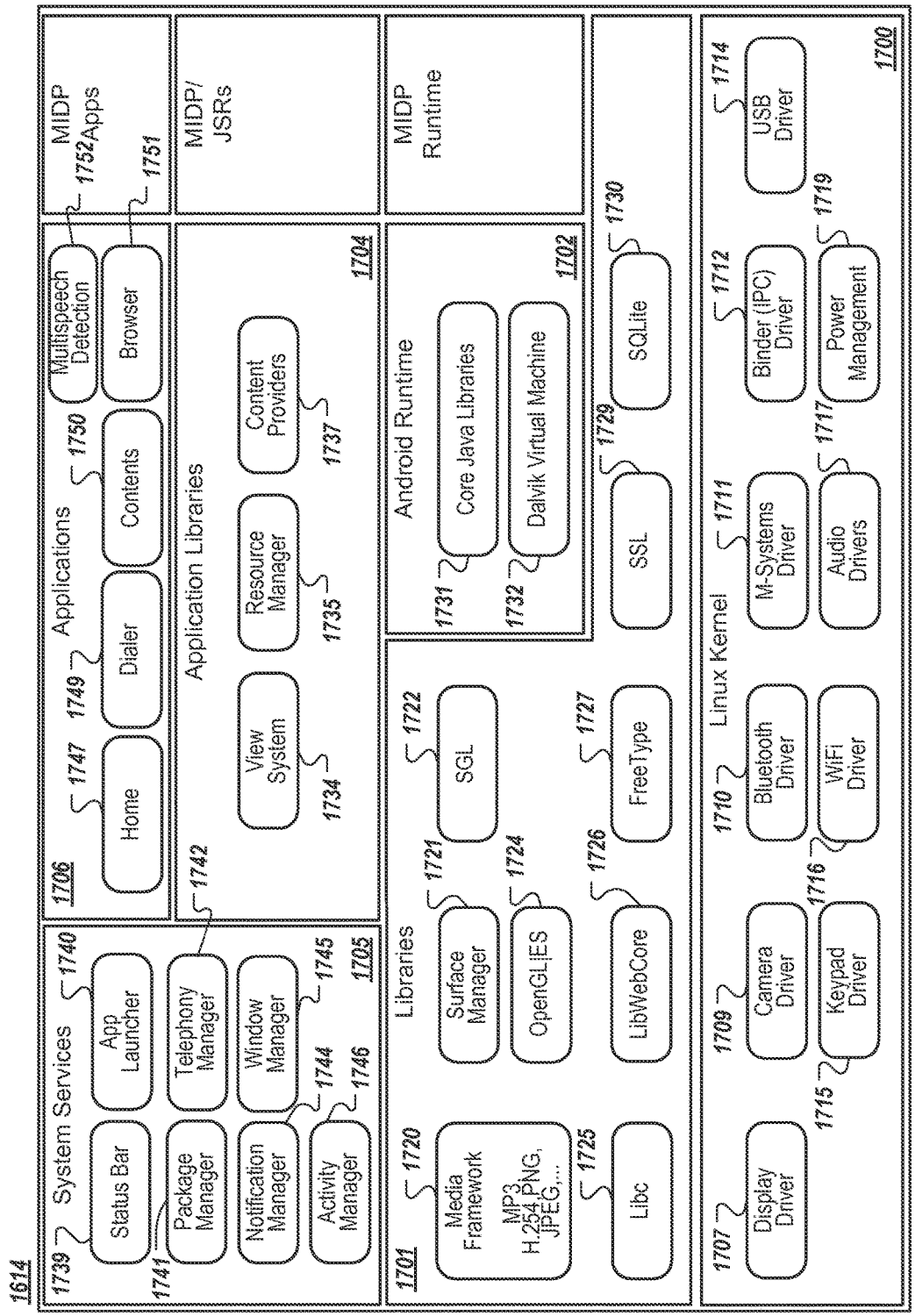
FIG. 17 is a block diagram illustrating exemplary components of the operating system used by the device of FIG. 15.

FIG. 17 is a block diagram illustrating exemplary components of the operating system 1614 used by the device 1500, in the case where the operating system 1614 is the GOOGLE mobile device platform. The operating system 1614 invokes multiple processes, while ensuring that the associated phone application is responsive, and that wayward applications do not cause a fault (or "crash") of the operating system. Using task switching, the operating system 1614 allows for the switching of applications while on a telephone call, without losing the state of each associated application. The operating system 1614 may use an application framework to encourage reuse of components, and provide a scalable user experience by combining pointing device and keyboard inputs and by allowing for pivoting. Thus, the operating system 1614 can provide a rich graphics system and media experience, while using an advanced, standards-based web browser.

The operating system 1614 can generally be organized into six components: a kernel 1700, libraries 1701, an operating system runtime 1702, application libraries 1704, system services 1705, and applications 1706. The kernel 1700 includes a display driver 1707 that allows software such as the operating system 1614 and the application programs 1715 to interact with the display 1501 via the display interface 1602, a camera driver 1709 that allows the software to interact with the camera 1507; a BLUETOOTH driver 1710; a M-Systems driver 1711; a binder (IPC) driver 1712, a USB driver 1714 a keypad driver 1715 that allows the software to interact with the keyboard 1502 via the keyboard interface 1604; a WiFi driver 1716; audio drivers 1717 that allow the software to interact with the microphone 1509 and the speaker 1510 via the sound interface 1609; and a power management component 1719 that allows the software to interact with and manage the power source 1619.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 1701 include a media framework 1720 that supports standard video, audio and still-frame formats (such as Moving Picture Experts Group (MPEG)-11, H.264, MPEG-1 Audio Layer-10 (MP3), Advanced Audio Coding (AAC), Adaptive Multi-Rate (AMR), Joint Photographic Experts Group (JPEG), and others) using an efficient JAVA Application Programming Interface (API) layer; a surface manager 1721; a simple graphics library (SGL) 1722 for two-dimensional application drawing; an Open Graphics Library for Embedded Systems (OpenGL ES) 1724 for gaming and three-dimensional rendering; a C standard library (LIBC) 1725; a LIBWEBCORE library 1726; a FreeType library 1727; an SSL 1729; and an SQLite library 1730.

The operating system runtime 1702 includes core JAVA libraries 1731, and a Dalvik virtual machine 1732. The Dalvik virtual machine 1732 is a custom, virtual machine that runs a customized file format (.DEX).

The operating system 1614 can also include Mobile Information Device Profile (MIDP) components such as the MIDP JAVA Specification Requests (JSRs) components, MIDP runtime, and MIDP applications as shown in FIG. 17. The MIDP components can support MIDP applications running on the device 1500.

With regard to graphics rendering, a system-wide composer manages surfaces and a frame buffer and handles window transitions, using the OpenGL ES 1724 and two-dimensional hardware accelerators for its compositions.

The Dalvik virtual machine 1732 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 1704 include a view system 1734, a resource manager 1735, and content providers 1737. The system services 1705 includes a status bar 1739; an application launcher 1740; a package manager 1741 that maintains information for all installed applications; a telephony manager 1742 that provides an application level JAVA interface to the telephony subsystem 1620; a notification manager 1744 that allows all applications access to the status bar and on-screen notifications; a window manager 1745 that allows multiple applications with multiple windows to share the display 1501; and an activity manager 1746 that runs each application in a separate process, manages an application life cycle, and maintains a cross-application history.

The applications 1706 include a home application 1747, a dialer application 1749, a contacts application 1750, a browser application 1751, and a multispeech detection application 1752.

The telephony manager 1742 provides event notifications (such as phone state, network state, Subscriber Identity Module (SIM) status, or voicemail status), allows access to state information (such as network information, SIM information, or voicemail presence), initiates calls, and queries and controls the call state. The browser application 1751 renders web pages in a full, desktop-like manager, including navigation functions. Furthermore, the browser application 1751 allows single column, small screen rendering, and provides for the embedding of HTML views into other applications.

Figure 18:
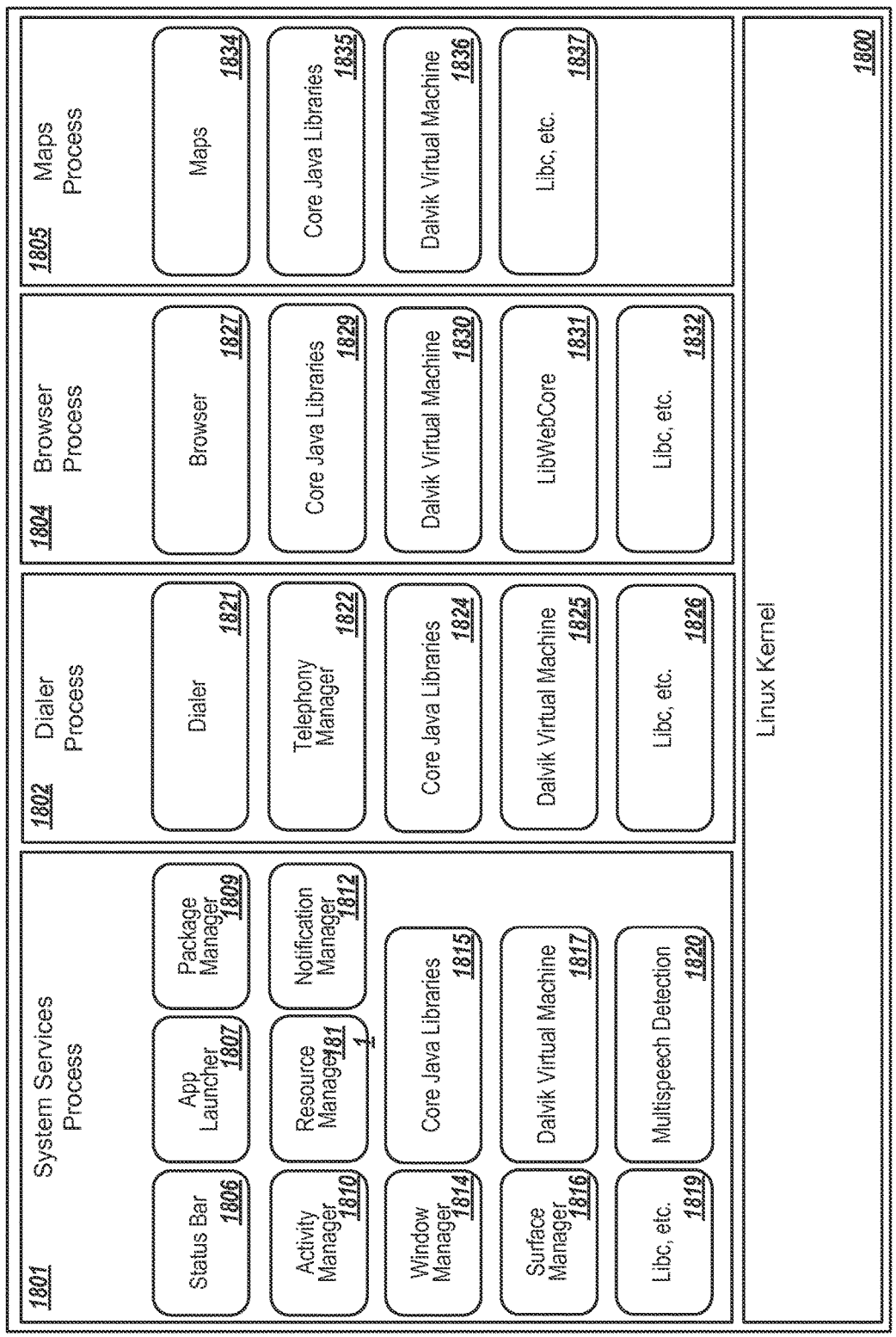
FIG. 18 is a block diagram illustrating exemplary processes implemented by the operating system kernel of FIG. 17.

FIG. 18 is a block diagram illustrating exemplary processes implemented by the operating system kernel 1800. Generally, applications and system services run in separate processes, where the activity manager 1746 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 1816, the window manager 1814, or the activity manager 1810 can be continuously executed while the device 1500 is powered. Additionally, some application-specific process can also be persistent. For example, processes associated with the dialer application 1821, may also be persistent.

The processes implemented by the operating system kernel 1800 may generally be categorized as system services processes 1801, dialer processes 1802, browser processes 1804, and maps processes 1805. The system services processes 1801 include status bar processes 1806 associated with the status bar 1739; application launcher processes 1807 associated with the application launcher 1740; package manager processes 1809 associated with the package manager 1741; activity manager processes 1810 associated with the activity manager 1746; resource manager processes 1811 associated with a resource manager 1735 that provides access to graphics, localized strings, and XML layout descriptions; notification manger processes 1812 associated with the notification manager 1744; window manager processes 1814 associated with the window manager 1845; core JAVA libraries processes 1815 associated with the core JAVA libraries 1731; surface manager processes 1816 associated with the surface manager 1721; Dalvik virtual machine processes 1817 associated with the Dalvik virtual machine 1732, LIBC processes 1819 associated with the LIBC library 1725; and multispeech detection processes 1820 associated with the multispeech detection application 1752.

The dialer processes 1802 include dialer application processes 1821 associated with the dialer application 1749; telephony manager processes 1822 associated with the telephony manager 1742; core JAVA libraries processes 1824 associated with the core JAVA libraries 1731; Dalvik virtual machine processes 1825 associated with the Dalvik Virtual machine 1732; and LIBC processes 1826 associated with the LIBC library 1725. The browser processes 1804 include browser application processes 1827 associated with the browser application 1751; core JAVA libraries processes 1829 associated with the core JAVA libraries 1731; Dalvik virtual machine processes 1830 associated with the Dalvik virtual machine 1732; LIBWEBCORE processes 1831 associated with the LIBWEBCORE library 1726; and LIBC processes 1832 associated with the LIBC library 1725.

The maps processes 1805 include maps application processes 1834, core JAVA libraries processes 1835, Dalvik virtual machine processes 1836, and LIBC processes 1837. Notably, some processes, such as the Dalvik virtual machine processes, may exist within one or more of the systems services processes 1801, the dialer processes 1802, the browser processes 1804, and the maps processes 1805.

Figure 19:
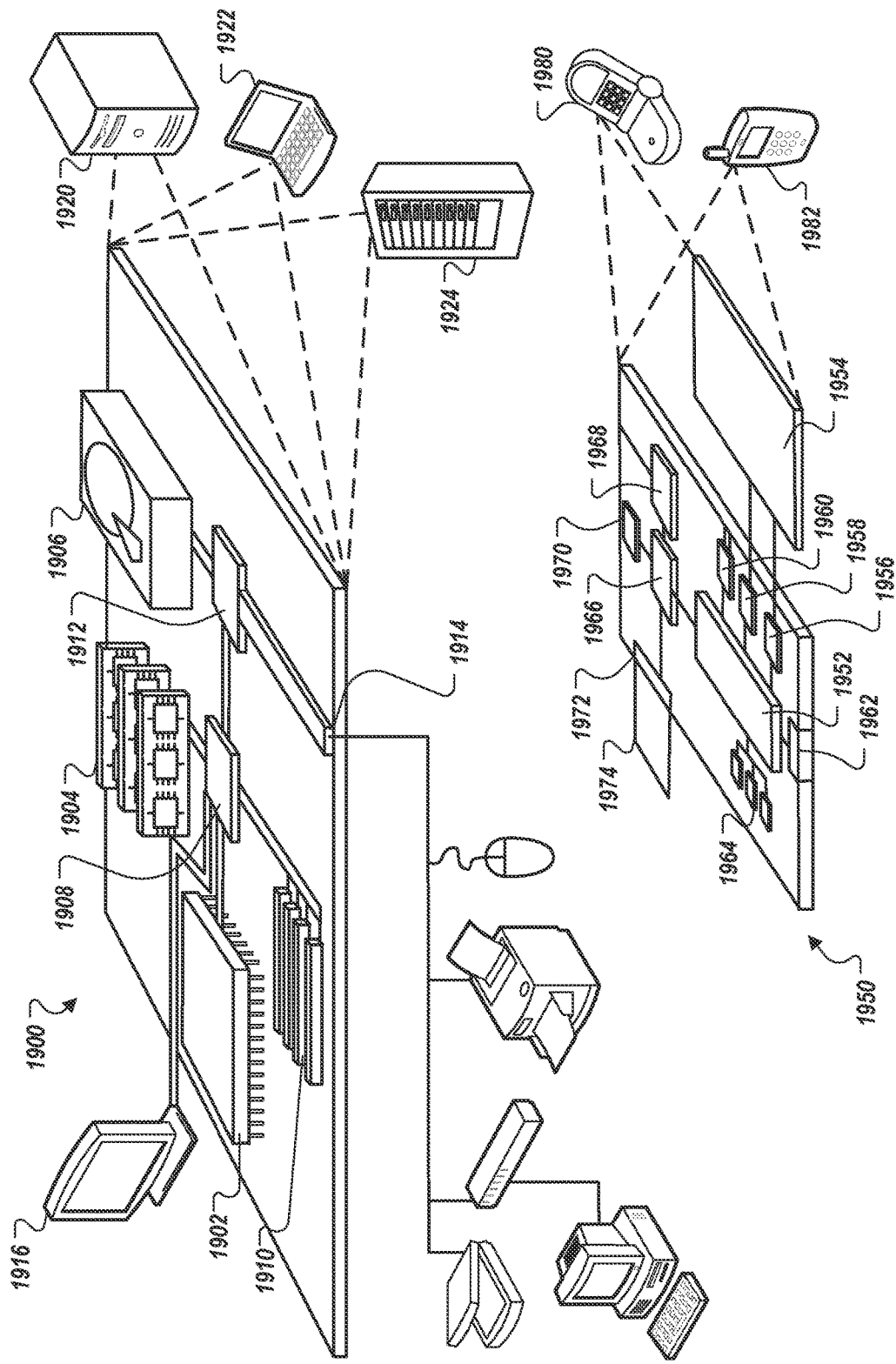
FIG. 19 shows an example of a computer device and a mobile computer device that can be used to implement the techniques described here.

FIG. 19 shows an example of a generic computer device 1900 and a generic mobile computer device 1950, which may be used with the techniques described here. Computing device 1900 is intended to represent various forms of digital computers, such as laptops, desktops, workstations, personal digital assistants, servers, blade servers, mainframes, and other appropriate computers. Computing device 1950 is intended to represent various forms of mobile devices, such as personal digital assistants, cellular telephones, smartphones, and other similar computing devices. The components shown here, their connections and relationships, and their functions, are meant to be exemplary only, and are not meant to limit the implementations described and/or claimed in this document.

Computing device 1900 includes a processor 1902, memory 1904, a storage device 1906, a high-speed interface 1908 connecting to memory 1904 and high-speed expansion ports 1910, and a low speed interface 1912 connecting to low speed bus 1914 and storage device 1906. Each of the components 1902, 1904, 1906, 1908, 1910, and 1912, are interconnected using various busses, and may be mounted on a common motherboard or in other manners as appropriate. The processor 1902 can process instructions for execution within the computing device 1900, including instructions stored in the memory 1904 or on the storage device 1906 to display graphical information for a GUI on an external input/output device, such as display 1916 coupled to high speed interface 1908. In other implementations, multiple processors and/or multiple buses may be used, as appropriate, along with multiple memories and types of memory. Also, multiple computing devices 1900 may be connected, with each device providing portions of the necessary operations (e.g., as a server bank, a group of blade servers, or a multi-processor system).

The memory 1904 stores information within the computing device 1900. In one implementation, the memory 1904 is a volatile memory unit or units. In another implementation, the memory 1904 is a non-volatile memory unit or units. The memory 1904 may also be another form of computer-readable medium, such as a magnetic or optical disk.

The storage device 1906 is capable of providing mass storage for the computing device 1900. In one implementation, the storage device 1906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1904, the storage device 1906, memory on processor 1902, or a propagated signal.

The high speed controller 1908 manages bandwidth-intensive operations for the computing device 1900, while the low speed controller 1912 manages lower bandwidth-intensive operations. Such allocation of functions is exemplary only. In one implementation, the high-speed controller 1908 is coupled to memory 1904, display 1916 (e.g., through a graphics processor or accelerator), and to high-speed expansion ports 1910, which may accept various expansion cards (not shown). In the implementation, low-speed controller 1912 is coupled to storage device 1906 and low-speed expansion port 1914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1900 may be implemented in a number of different forms, as shown in the figure. For example, it may be implemented as a standard server 1920, or multiple times in a group of such servers. It may also be implemented as part of a rack server system 1924. In addition, it may be implemented in a personal computer such as a laptop computer 1922. Alternatively, components from computing device 1900 may be combined with other components in a mobile device (not shown), such as device 1950. Each of such devices may contain one or more of computing device 1900, 1950, and an entire system may be made up of multiple computing devices 1900, 1950 communicating with each other.

Computing device 1950 includes a processor 1952, memory 1964, an input/output device such as a display 1954, a communication interface 1966, and a transceiver 1968, among other components. The device 1950 may also be provided with a storage device, such as a microdrive or other device, to provide additional storage. Each of the components 1950, 1952, 1964, 1954, 1966, and 1968, are interconnected using various buses, and several of the components may be mounted on a common motherboard or in other manners as appropriate.

The processor 1952 can execute instructions within the computing device 1950, including instructions stored in the memory 1964. The processor may be implemented as a chipset of chips that include separate and multiple analog and digital processors. The processor may provide, for example, for coordination of the other components of the device 1950, such as control of user interfaces, applications run by device 1950, and wireless communication by device 1950.

Processor 1952 may communicate with a user through control interface 1958 and display interface 1956 coupled to a display 1954. The display 1954 may be, for example, a TFT LCD (Thin-Film-Transistor Liquid Crystal Display) or an OLED (Organic Light Emitting Diode) display, or other appropriate display technology. The display interface 1956 may comprise appropriate circuitry for driving the display 1954 to present graphical and other information to a user. The control interface 1958 may receive commands from a user and convert them for submission to the processor 1952. In addition, an external interface 1962 may be provide in communication with processor 1952, so as to enable near area communication of device 1950 with other devices. External interface 1962 may provide, for example, for wired communication in some implementations, or for wireless communication in other implementations, and multiple interfaces may also be used.

The memory 1964 stores information within the computing device 1950. The memory 1964 can be implemented as one or more of a computer-readable medium or media, a volatile memory unit or units, or a non-volatile memory unit or units. Expansion memory 1974 may also be provided and connected to device 1950 through expansion interface 1972, which may include, for example, a SIMM (Single In Line Memory Module) card interface. Such expansion memory 1974 may provide extra storage space for device 1950, or may also store applications or other information for device 1950. Specifically, expansion memory 1974 may include instructions to carry out or supplement the processes described above, and may include secure information also. Thus, for example, expansion memory 1974 may be provide as a security module for device 1950, and may be programmed with instructions that permit secure use of device 1950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1964, expansion memory 1974, memory on processor 1952, or a propagated signal that may be received, for example, over transceiver 1968 or external interface 1962.

Device 1950 may communicate wirelessly through communication interface 1966, which may include digital signal processing circuitry where necessary. Communication interface 1966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radiofrequency transceiver 1968. In addition, short-range communication may occur, such as using a Bluetooth, WiFi, or other such transceiver (not shown). In addition, GPS (Global Positioning System) receiver module 1970 may provide additional navigation- and location-related wireless data to device 1950, which may be used as appropriate by applications running on device 1950.

Device 1950 may also communicate audibly using audio codec 1960, which may receive spoken information from a user and convert it to usable digital information. Audio codec 1960 may likewise generate audible sound for a user, such as through a speaker, e.g., in a handset of device 1950. Such sound may include sound from voice telephone calls, may include recorded sound (e.g., voice messages, music files, etc.) and may also include sound generated by applications operating on device 1950.

The computing device 1950 may be implemented in a number of different forms, as shown in the figure. For example, it may be implemented as a cellular telephone 1980. It may also be implemented as part of a smartphone 1982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
   initiating, by a mobile computing device, an audio recording process using a microphone of the mobile computing device;
   identifying, by the mobile computing device, a first orientation of the mobile computing device at a beginning of the audio recording process;
   determining, during the audio recording process, that the mobile computing device has transitioned from the first orientation to a second orientation;
   in response to determining that the mobile computing device has transitioned from the first orientation to a second orientation, determining a speech energy threshold for comparing to speech received during the audio recording process and while the mobile computing device is in the second orientation;
   comparing an energy of the speech received during the audio recording process and while the mobile computing device is in the second orientation to the speech energy threshold;
   determining an end of speech condition based on (i) the energy of the speech received during the audio recording process and while the mobile computing device is in the second orientation and (ii) the speech energy threshold; and
   stopping, based on determining the end of speech condition, the audio recording process.

2. The method of claim 1, wherein identifying the first orientation of the mobile computing device is performed in response to a proximity sensor of the mobile computing device detecting an object within a predetermined distance of the proximity sensor.

3. The method of claim 1, wherein identifying the first orientation of the mobile computing device comprises detecting that a user is within a predetermined distance of a proximity sensor of the mobile computing device, and wherein determining that the mobile computing device has transitioned from the first orientation to the second orientation includes determining that the user is no longer within the predetermined distance of the proximity sensor.

4. The method of claim 1, wherein determining that the mobile computing device has transitioned from the first orientation to the second orientation is performed using one or more accelerometers of the mobile computing device.

5. The method of claim 1, comprising:
   classifying the transition of the mobile computing device from the first orientation to the second orientation as one of a "to mouth" gesture, a "from mouth" gesture, a "to ear" gesture, or a "from ear" gesture,
   wherein determining the speech energy threshold for comparing to speech received during the audio recording process and while the mobile computing device is in the second orientation is based on classifying the transition of the mobile computing device from the first orientation to the second orientation as one of the "to mouth" gesture, the "from mouth" gesture, the "to ear" gesture, or the "from ear" gesture.

6. The method of claim 1, wherein determining, during the audio recording process, that the mobile computing device has transitioned from the first orientation to the second orientation comprises determining that an angle between a user and the mobile computing device is outside of a selected set of angles.

7. The method of claim 1, wherein determining, during the audio recording process, that the mobile computing device has transitioned from the first orientation to the second orientation comprises determining that the mobile computing device is beyond a predetermined distance from a portion of a user.

8. The method of claim 1, comprising:
   while the mobile computing device is in the first orientation, comparing the energy of the speech received during the audio recording process to a different speech energy threshold;
   determining that the energy of the speech received during the audio recording process and while the mobile computing device is in the first orientation does is greater than the different speech energy threshold; and
   based on determining that the energy of the speech received during the audio recording process and while the mobile computing device is in the first orientation is greater than the different speech energy threshold, continuing the audio recording process.

9. A non-transitory computer storage medium encoded with a computer program, the program comprising instructions that when executed by data processing apparatus cause the data processing apparatus to perform operations comprising:

initiating, by a mobile computing device, an audio recording process using a microphone of the mobile computing device;

identifying, by the mobile computing device, a first orientation of the mobile computing device at a beginning of the audio recording process;

determining, during the audio recording process, that the mobile computing device has transitioned from the first orientation to a second orientation;

in response to determining that the mobile computing device has transitioned from the first orientation to a second orientation, determining a speech energy threshold for comparing to speech received during the audio recording process and while the mobile computing device is in the second orientation;

comparing an energy of the speech received during the audio recording process and while the mobile computing device is in the second orientation to the speech energy threshold;

determining an end of speech condition based on (i) the energy of the speech received during the audio recording process and while the mobile computing device is in the second orientation and (ii) the speech energy threshold; and stopping, based on determining the end of speech condition, the audio recording process.

10. The computer storage medium of claim 9, wherein identifying the first orientation of the mobile computing device is performed in response to a proximity sensor of the mobile computing device detecting an object within a predetermined distance of the proximity sensor.

11. The computer storage medium of claim 9, wherein identifying the first orientation of the mobile computing device comprises detecting that a user is within a predetermined distance of a proximity sensor of the mobile computing device, and wherein determining that the mobile computing device has transitioned from the first orientation to the second orientation includes determining that the user is no longer within the predetermined distance of the proximity sensor.

12. The computer storage medium of claim 9, wherein determining that the mobile computing device has transitioned from the first orientation to the second orientation is performed using one or more accelerometers of the mobile computing device.

13. The computer storage medium of claim 9, comprising:
classifying the transition of the mobile computing device from the first orientation to the second orientation as one of a "to mouth" gesture, a "from mouth" gesture, a "to ear" gesture, or a "from ear" gesture,
wherein determining the speech energy threshold for comparing to speech received during the audio recording process and while the mobile computing device is in the second orientation is based on classifying the transition of the mobile computing device from the first orientation to the second orientation as one of the "to mouth" gesture, the "from mouth" gesture, the "to ear" gesture, or the "from ear" gesture.

14. The computer storage medium of claim 9, wherein determining, during the audio recording process, that the mobile computing device has transitioned from the first orientation to the second orientation comprises determining that an angle between a user and the mobile computing device is outside of a selected set of angles.

15. The computer storage medium of claim 9, wherein determining, during the audio recording process, that the mobile computing device has transitioned from the first orientation to the second orientation comprises determining that the mobile computing device is beyond a predetermined distance from a portion of a user.

16. A system comprising:
one or more computers and one or more storage devices storing instructions that are operable, when executed by the one or more computers, to cause the one or more computers to perform operations comprising:

initiating, by a mobile computing device, an audio recording process using a microphone of the mobile computing device;

identifying, by the mobile computing device, a first orientation of the mobile computing device at a beginning of the audio recording process;

determining, during the audio recording process, that the mobile computing device has transitioned from the first orientation to a second orientation;

in response to determining that the mobile computing device has transitioned from the first orientation to a second orientation, determining a speech energy threshold for comparing to speech received during the audio recording process and while the mobile computing device is in the second orientation;

comparing an energy of the speech received during the audio recording process and while the mobile computing device is in the second orientation to the speech energy threshold;

determining an end of speech condition based on (i) the energy of the speech received during the audio recording process and while the mobile computing device is in the second orientation and (ii) the speech energy threshold; and stopping, based on determining the end of speech condition, the audio recording process.

17. The system of claim 16, wherein identifying the first orientation of the mobile computing device is performed in response to a proximity sensor of the mobile computing device detecting an object within a predetermined distance of the proximity sensor.

18. The system of claim 16, wherein identifying the first orientation of the mobile computing device comprises detecting that a user is within a predetermined distance of a proximity sensor of the mobile computing device, and wherein determining that the mobile computing device has transitioned from the first orientation to the second orientation includes determining that the user is no longer within the predetermined distance of the proximity sensor.

19. The system of claim 16, wherein determining that the mobile computing device has transitioned from the first orientation to the second orientation is performed using one or more accelerometers of the mobile computing device.

20. The system of claim 16, wherein the operations further comprise:
classifying the transition of the mobile computing device from the first orientation to the second orientation as one of a "to mouth" gesture, a "from mouth" gesture, a "to ear" gesture, or a "from ear" gesture,
wherein determining the speech energy threshold for comparing to speech received during the audio recording process and while the mobile computing device is in the second orientation is based on classifying the transition of the mobile computing device from the first orientation to the second orientation as one of the "to mouth" gesture, the "from mouth" gesture, the "to ear" gesture, or the "from ear" gesture.

* * * * *